(12) United States Patent
Braber et al.

(10) Patent No.: US 12,508,273 B2
(45) Date of Patent: Dec. 30, 2025

(54) BETA-1,3'-GALACTOSYLLACTOSE FOR THE TREATMENT OF GUT BARRIER FUNCTION DISEASES

(71) Applicant: N.V. Nutricia, Zoetermeer (NL)

(72) Inventors: Saskia Braber, Zeist (NL); Belinda Potappel - van 't Land, Utrecht (NL); Selma Paulien Wiertsema, Utrecht (NL); Johan Garssen, Utrecht (NL); Bernd Stahl, Utrecht (NL); Marko Mank, Allendorf (DE)

(73) Assignee: N.V. Nutricia, Zoetermeer (NL)

( * ) Notice: Subject to any disclaimer, the term of this patent is extended or adjusted under 35 U.S.C. 154(b) by 953 days.

(21) Appl. No.: 17/610,714

(22) PCT Filed: May 15, 2020

(86) PCT No.: PCT/EP2020/063720
§ 371 (c)(1),
(2) Date: Nov. 12, 2021

(87) PCT Pub. No.: WO2020/229690
PCT Pub. Date: Nov. 19, 2020

(65) Prior Publication Data
US 2022/0218728 A1    Jul. 14, 2022

(30) Foreign Application Priority Data

May 15, 2019   (EP) .................................... 19174750

(51) Int. Cl.
| A61K 31/702 | (2006.01) |
| A23L 29/00 | (2016.01) |
| A23L 29/30 | (2016.01) |
| A23L 33/00 | (2016.01) |
| A23L 33/12 | (2016.01) |
| A23L 33/125 | (2016.01) |
| A23L 33/17 | (2016.01) |

(52) U.S. Cl.
CPC ............ *A61K 31/702* (2013.01); *A23L 29/04* (2016.08); *A23L 29/30* (2016.08); *A23L 33/12* (2016.08); *A23L 33/125* (2016.08); *A23L 33/17* (2016.08); *A23L 33/40* (2016.08)

(58) Field of Classification Search
CPC .................................................. A61K 31/702
See application file for complete search history.

(56) References Cited

U.S. PATENT DOCUMENTS

| 2010/0104696 A1* | 4/2010 | Banavara ................ A23L 33/40 426/72 |
| 2012/0141541 A1* | 6/2012 | Stahl ........................ A61P 1/00 424/278.1 |
| 2014/0335065 A1* | 11/2014 | Davis .................. A61K 31/702 424/93.4 |

FOREIGN PATENT DOCUMENTS

| EP | 2404507 A1 | 1/2012 |
| WO | 2005/003329 A1 | 1/2005 |
| WO | 2010/023422 A1 | 3/2010 |
| WO | 2010/122344 A1 | 10/2010 |
| WO | 2014/155056 A1 | 10/2014 |
| WO | 2020/013683 A1 | 1/2020 |

OTHER PUBLICATIONS

Woodmansee,, J Allergy Clin Immunol vol. 108, No. 2, p. 309, Aug. 2001. (Year: 2001).*
Bzikowska-Jura, Nutrients 2019, 11, 1585, pp. 1-16. (Year: 2019).*
Majamaa, Clinical and Experimental Allergy, 1996, vol. 26, pp. 181-187. (Year: 1996).*
Kim, CEP vol. 62, No. 8, pp. 301-309, 2020. (Year: 2020).*
Sever, ICAN vol. 7, Issue 3, Jun. 2015, pp. 162-165. (Year: 2015).*
Giuffrida, European Journal of Nutrition (2022) 61; 2167-2182. (Year: 2022).*
Willemsen, Eur J Nutr (2008) 47: 183-191. (Year: 2008).*
David S Newburg et al: "Human Milk Oligosaccharides and Synthetic Galactosyloligosaccharides Contain 3#-, 4- and 6#-Galactosyllactose and Attenuate Inflammation in Human T84, NCM-460, and H4 Cells and Intestinal Tissue Ex Vivo", The Journal of Nutrition, vol. 146, No. 2, Dec. 23, 2015, pp. 358-367.
Milo Ohr, L: "Improving the Gut Feeling", Food Technology, Institute of Food Technologists, Chicago, IL, US, vol. 56, No. 10, Oct. 1, 2002, pp. 67-70.
Soheil Varasteh et al: "Human milk oligosaccharide 3'-galactosyllactose can protect the intestinal barrier to challenges", Journal of Pediatric Gastroenterology and Nutrition, vol. 68, No. Suppl. 1, May 15, 2019, pp. 1049-1050.

* cited by examiner

*Primary Examiner* — Layla D Berry
(74) *Attorney, Agent, or Firm* — Ipsilon USA—NLO

(57) ABSTRACT

The invention relates to the use of beta1,3'-galactosyllactose for improving the gut barrier function. This can in particular be administered to subjects at risk for increased gut barrier permeability, preferably infants and young children.

10 Claims, 3 Drawing Sheets

BETA-1,3'-GALACTOSYLLACTOSE FOR THE TREATMENT OF GUT BARRIER FUNCTION DISEASES

FIELD OF THE INVENTION

The present invention relates to the field of infant and young child formula and the improvement of the intestinal health.

BACKGROUND OF THE INVENTION

Human milk fed infants have a lower incidence of infections than formula fed infants. Many components in human milk, including immunoglobulins (such as sIgA), interleukin (IL)-1, IL-6, IL-8, IL-10, interferon-γ (IFN-γ), immunocompetent cells, transforming growth factor-β (TGF-β), lactoferrin, nucleotides and human milk oligosaccharides (HMOs) are thought to play a role in protection against infection with pathogens.

HMOs are a major component in human milk, and are non-digestible oligosaccharides (NDOs). Human milk oligosaccharides play an essential role in the postnatal growth and development of the intestinal and immune system. They may promote the growth of beneficial bacteria in the intestinal tract. Some HMOs are also known to directly prevent adhesion of pathogens or toxins to the intestinal wall.

Human milk is the preferred nutrition for infants. However, it is not always possible or desirable to breast feed an infant. In such cases infant formulae or follow on formulae are a good alternative. These formulae should have an optimal composition in order to mimic the beneficial effects of human milk as close as possible.

Galacto-oligosaccharides (GOS), widely used in infant formulas, were found to protect the intestinal epithelial barrier by maintaining the tight junction network and modulating the inflammatory responses (Akbari et al., The Journal of Nutrition, 145(7), 2015, P 1604-1613). The structure of GOS is based on lactose elongated by one or more galactoses, and GOS comprises some identical structures to the core molecules in the tri-saccharide fraction of HMOs. One specific functional structure of HMOs is based on the elongation of lactose (galactose-glucose) with a further galactose residue forming three immune active galactosyl-lactoses (Gal-Lac or GL), namely 3'-galactosyl-lactose, 4'-galactosyl-lactose and 6'-galactosyl-lactose (Newburg et al., 2016, J Nutr 146:358-367). 3'-galactosyl-lactose, 4'-galactosyl-lactose and 6'-galactosyl-lactose are herein also referred to as 3'-GL, 4'-GL and 6'-GL, respectively.

WO 2005/122790 discloses a method for stimulating barrier integrity by administering a composition comprising eicosapentaenoic acid (EPA), docosahexaenoic acid (DHA) and arachidonic acid (ARA), and at least two distinct oligosaccharides. The oligosaccharides act indirectly by being fermented to short chain fatty acids (SCFA) by the intestinal microbiota. The SCFA are then the active ingredient that support the intestinal barrier function.

WO 2010/023422 discloses the use of galacto-oligosaccharides for the prevention or treatment of inflammation. A mix of galacto-oligosaccharides is tested.

WO 2016/013935 discloses the use of a non-digestible oligosaccharide in the manufacture of a composition for providing nutrition to an infant suffering from an increased risk of food allergy. The infant is preferably at increased risk of trichothecene mycotoxin exposure, for instance by eating a lot of cereals. In the examples VivinalGOS is the source of galacto-oligosaccharides.

WO 2013/016111 discloses nutritional compositions with galacto-oligosaccharides for preventing injury and/or improving the healing of the gastrointestinal tract. A mix of galacto-oligosaccharides is tested.

SUMMARY OF THE INVENTION

The inventors found that the ability of structurally different galactosyl-lactoses (GL) to protect the intestinal epithelial barrier function was strongly dependent on the specific structure of the GL. Human intestinal epithelial Caco-2 cell monolayers grown in a transwell system, which is a model for intestinal barrier function, were pretreated with different galactosyl-lactoses, including beta1,3'-galactosyllactose, alpha1,3'-galactosyllactose, beta1,4-galactosyllactose and beta1,6'-galactosyllactose, before being exposed to the fungal toxin deoxynivalenol. The transepithelial barrier integrity and release of pro-inflammatory cytokines was measured. It was found that beta1,3'-galactosyllactose prevented loss of epithelial barrier integrity to a much higher extent than other galactosyl-lactoses. However, all galactosyl-lactoses were able to decrease the IL-8 release, which is indicative for an anti-inflammatory effect. When different mixtures of GOS were compared, the mixture that was rich in beta1,3'-galactosyllactose was much more effective, and already at a lower dose, in improving the intestinal barrier function than the GOS mixture that contained no or very low amounts of beta1,3'-galactosyllactose. This is indicative of the use for intestinal barrier function improvement in infants by beta1,3'-galactosyllactose. These results indicate that beta1,3'-galactosyllactose has an effect of increasing the intestinal barrier function. In addition beta1,3'-galactosyllactose can be used for the prevention and/or treatment of intestinal barrier disruption. The results further indicate that beta1,3'-galactosyllactose is effective for the treatment, prevention and/or alleviation of a toxin exposure associated condition. The toxin preferably is a mycotoxin, more preferably a tricothecene toxin and most preferably the toxin is deoxynivalenol (DON).

DETAILED DESCRIPTION OF THE INVENTION

The present invention relates to the trisaccharide Gal (beta 1-3)-Gal (beta 1-4)-Glc for use in increasing the intestinal barrier function and/or for use in the prevention and/or treatment of intestinal barrier disruption in a subject.

The invention further relates to a nutritional composition for use in increasing the intestinal barrier function and/or for use in the prevention and/or treatment of intestinal barrier disruption in a subject, wherein the nutritional composition comprises the trisaccharide Gal (beta 1-3)-Gal (beta 1-4)-Glc (beta1,3'-galactosyllactose) as an active ingredient.

The invention further relates to a nutritional composition comprising the trisaccharide Gal (beta 1-3)-Gal (beta 1-4)-Glc, for use in the treatment, prevention and/or alleviation of a toxin exposure associated condition in a subject, wherein the toxin preferably is a mycotoxin, more preferably a tricothecene toxin, even more preferably the toxin is deoxynivalenol.

The present invention also relates to an infant formula, follow on formula or young child formula, preferably an infant formula or follow on formula, comprising:
  a. 1.6 to 4 g protein based on 100 kcal,
  b. 5 to 20 g digestible carbohydrates based on 100 kcal,
  c. 3 to 7 g lipid based on 100 kcal, wherein the lipid comprises:

i. LCPUFA selected from the group consisting of DHA, EPA and ARA, wherein the sum of DHA, ARA and EPA is at least 1 wt % based on total fatty acids, and/or ii. at least 0.1 wt % EPA based on total fatty acids and at least 0.5 wt % DHA based on total fatty acids, and optionally further at least 0.25 wt % ARA based on total fatty acids, d. 0.25 to 2.5 g non-digestible oligosaccharides per 100 ml of ready to drink formula, wherein the non-digestible oligosaccharides comprise Gal (beta 1-3)-Gal (beta 1-4)-Glc in an amount of 10 to 500 mg per 100 ml ready to drink formula.

In some jurisdictions the present invention can be worded as the use of the trisaccharide Gal (beta 1-3)-Gal (beta 1-4)-Glc for the manufacture of a nutritional composition for increasing the intestinal barrier function and/or for the prevention and/or treatment of intestinal barrier disruption in a subject.

In some jurisdictions the invention further relates to the use of the trisaccharide Gal (beta 1-3)-Gal (beta 1-4)-Glc for the manufacture of a nutritional composition for the treatment, prevention and/or alleviation of a toxin exposure associated condition in a subject, wherein the toxin preferably is a mycotoxin, more preferably a tricothecene toxin, most preferably the toxin is deoxynivalenol.

In some jurisdictions the invention can be worded as the use of the trisaccharide Gal (beta 1-3)-Gal (beta 1-4)-Glc for increasing the intestinal barrier function and/or for the prevention and/or treatment of intestinal barrier disruption in a subject.

In some jurisdictions the invention further relates to the use of a nutritional composition for increasing the intestinal barrier function and/or for the prevention and/or treatment of intestinal barrier disruption in a subject, wherein the nutritional composition comprises the trisaccharide Gal (beta 1-3)-Gal (beta 1-4)-Glc (beta1,3'-galactosyllactose) as an active ingredient.

In some jurisdictions the invention also relates to the use of a nutritional composition comprising the trisaccharide Gal (beta 1-3)-Gal (beta 1-4)-Glc, for the treatment, prevention and/or alleviation of a toxin exposure associated condition in a subject, wherein the toxin preferably is a mycotoxin, more preferably a tricothecene toxin, most preferably the toxin is deoxynivalenol.

In some jurisdictions the invention can be worded as a method for increasing the intestinal barrier function and/or for prevention and/or treatment of intestinal barrier disruption in a subject, the method comprising administering the trisaccharide Gal (beta 1-3)-Gal (beta 1-4)-Glc to the subject.

In some jurisdictions the invention also relates to a method for increasing the intestinal barrier function and/or for use in the prevention and/or treatment of intestinal barrier disruption in a subject, the method comprising administering a nutritional composition comprising the trisaccharide Gal (beta 1-3)-Gal (beta 1-4)-Glc as an active ingredient to the subject.

In some jurisdictions the invention further relates to a method for the treatment, prevention and/or alleviation of a toxin exposure associated condition in a subject, wherein the toxin preferably is a mycotoxin, more preferably a tricothecene toxin, and most preferably the toxin is deoxynivalenol, the method comprising administering a nutritional composition comprising the trisaccharide Gal (beta 1-3)-Gal (beta 1-4)-Glc to the subject.

In some jurisdictions administering a nutritional composition to an infant is considered non-therapeutic. In these jurisdictions, hence an above aspect of the present invention can be worded as a non-therapeutic method for increasing the intestinal barrier function and/or for prevention and/or treatment of intestinal barrier disruption in a subject, the method comprising administering the trisaccharide Gal (beta 1-3)-Gal (beta 1-4)-Glc to the subject.

Likewise an above aspect of the present invention can be worded as a non-therapeutic method for increasing the intestinal barrier function and/or for use in the prevention and/or treatment of intestinal barrier disruption in a subject, the method comprising administering a nutritional composition comprising the trisaccharide Gal (beta 1-3)-Gal (beta 1-4)-Glc as an active ingredient to the subject.

Likewise an above aspect of the present invention can be worded as a non-therapeutic method for the treatment, prevention and/or alleviation of a toxin exposure associated condition in a subject, wherein the toxin preferably is a mycotoxin, more preferably a tricothecene toxin, and most preferably the toxin is deoxynivalenol, the method comprising administering a nutritional composition comprising the trisaccharide Gal (beta 1-3)-Gal (beta 1-4)-Glc to the subject.

The trisaccharide Gal (beta 1-3)-Gal (beta 1-4)-Glc is herein also referred to as beta1,3'-galactosyl-lactose or beta3'-GL.

In the context of the present invention the term "prevention" means "reducing the risk of" or "reducing the severity of". The term "prevention of a certain condition" also includes "treatment of a person at risk of said condition".

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Galacto-Oligosaccharides and Beta1,3'-Galactosyllactose

The present invention relates to the trisaccharide Gal-(beta 1,3)-Gal-(beta 1,4)-Glc, herein also referred to as beta1,3'-galactosyllactose or beta3'-GL, for use in increasing the intestinal barrier function in a subject. The invention also relates to the trisaccharide Gal-(beta 1,3)-Gal-(beta 1,4)-Glc, for use in the prevention and/or treatment of intestinal barrier disruption in a subject. This trisaccharide can be administered in pure form, in a suitable matrix, or in a nutritional composition. The trisaccharide may for example be part of a mixture of galacto-oligosaccharides (GOS), preferably beta-galacto-oligosaccharides (BGOS).

In a preferred embodiment, the beta1,3'-galactosyllactose is used as such. In another preferred embodiment, the beta1,3'-galactosyllactose is present in a nutritional composition. The invention thus also relates to beta1,3'-galactosyllactose for use in increasing the intestinal barrier function in a subject, wherein the beta1,3'-galactosyllactose is present in a nutritional composition, and to beta1,3'-galactosyllactose for use in the prevention and/or treatment of intestinal barrier disruption in a subject, wherein the beta1,3'-galactosyllactose is present in a nutritional composition. In addition, the invention relates to a nutritional composition for use in increasing the intestinal barrier function in a subject, wherein the nutritional composition comprises the trisaccharide Gal (beta 1-3)-Gal (beta 1-4)-Glc (beta1,3'-galactosyllactose) as an active ingredient, and to a nutritional composition for use in the prevention and/or treatment of intestinal barrier disruption in a subject, wherein the nutritional composition comprises the trisaccharide Gal (beta 1-3)-Gal (beta 1-4)-Glc (beta1,3'-galactosyllactose) as an active ingredient.

The nutritional composition for use according to the invention, the nutritional composition in the methods and uses of the present invention, and the nutritional composition comprising the trisaccharide for use, i.e. comprising the beta1,3'-galactosyllactose for use, according to the present invention are herein also referred to as the present nutritional composition, or nutritional composition according to the present invention, or final nutritional composition. The nutritional composition according to the present invention is not human milk.

The nutritional composition according to the present invention preferably comprises 0.07 to 3.75 wt %, more preferably 0.1 to 2 wt. %, Gal (beta 1-3)-Gal (beta 1-4)-Glc, based on dry weight of the nutritional composition. In a preferred embodiment, the nutritional composition comprises 0.07 to 0.375 wt % Gal (beta 1-3)-Gal (beta 1-4)-Glc, based on dry weight of the nutritional composition. In another preferred embodiment, the nutritional composition comprises 1.125 to 1.725 wt % Gal (beta 1-3)-Gal (beta 1-4)-Glc, based on dry weight of the nutritional composition. The nutritional composition according to the present invention preferably comprises 15 to 750 mg Gal (beta 1-3)-Gal (beta 1-4)-Glc, per 100 kcal of the nutritional composition. In a preferred embodiment, the nutritional composition comprises 15 to 75 mg Gal (beta 1-3)-Gal (beta 1-4)-Glc, per 100 kcal of the nutritional composition. In another preferred embodiment, the nutritional composition comprises 225 to 375 mg Gal (beta 1-3)-Gal (beta 1-4)-Glc, per 100 kcal of the nutritional composition. The nutritional composition according to the present invention preferably comprises 10 to 500 mg Gal (beta 1-3)-Gal (beta 1-4)-Glc, per 100 ml of the nutritional composition. In a preferred embodiment, the nutritional composition comprises 10 to 50 mg Gal (beta 1-3)-Gal (beta 1-4)-Glc, per 100 ml of the nutritional composition. In another preferred embodiment, the nutritional composition comprises 150 to 250 mg Gal (beta 1-3)-Gal (beta 1-4)-Glc, per 100 ml of the nutritional composition.

Both when the Gal (beta 1-3)-Gal (beta 1-4)-Glc is used as such and when it is present in a nutritional composition, it is preferred that the Gal (beta 1-3)-Gal (beta 1-4)-Glc is administered in a daily dose of at least 0.075 g, preferably at least 0.10 g or 0.15 g. It is preferred that the maximum daily dose is 6 g, preferably 1.5 g, 1.3 g or 0.5 g. Preferably the Gal (beta 1-3)-Gal (beta 1-4)-Glc is administered in a daily dose of 0.1 to 1.3 g, more preferred 0.1 g to 0.5 g.

It is preferred that the nutritional composition according to the present invention comprises 0.07 to 3.75 wt %, more preferably 0.1 to 2 wt. %, Gal (beta 1-3)-Gal (beta 1-4)-Glc, based on dry weight of the nutritional composition and that the Gal (beta 1-3)-Gal (beta 1-4)-Glc is administered in a daily dose of 0.10 to 6 g. Preferably the Gal (beta 1-3)-Gal (beta 1-4)-Glc is administered in a daily dose of 0.1 to 1.3 g, more preferred 0.1 to 0.5 g.

When the beta1,3'-galactosyllactose is present in a nutritional composition, in a preferred embodiment the nutritional composition is an infant formula, a follow on formula or a young child formula.

As described above, the beta1,3'-galactosyllactose may be part of a mixture of galacto-oligosaccharides (GOS), preferably beta-galacto-oligosaccharides (BGOS).

A suitable way to form GOS is to treat lactose with beta-galactosidases. Dependent on the specificity of the enzyme used, a galactose unit is hydrolysed from lactose and coupled to another lactose unit via a beta-linkage to form a trisaccharide. A galactose unit may also be coupled to another single galactose unit to form a disaccharide. Subsequent galactose units are coupled to form oligosaccharides. The majority of such formed oligosaccharides have a degree of polymerization (DP) of 7 or lower. Depending on the enzyme these linkages between the galactose residues can be predominantly beta1,4', beta1,6' or beta1,3'.

A suitable way to prepare beta1,6' and/or beta1,4' GOS is by using the beta-galactosidase from *Bacillus circulans*. A commercially available source of BGOS is Vivinal-GOS from FrieslandCampina Domo (Amersfoort, The Netherlands). Vivinal-GOS comprises BGOS mainly with DP2-8 (peak at DP3) and mainly with beta1,4' and beta1,6' linkages, with beta1,4' linkages being more predominant. Beta1,4'- and beta1,6'-galactosyl-lactose can be enriched or purified from these GOS mixtures as known in the art, for example by size exclusion chromatography. Other commercially available source of BGOS with predominantly beta1,4' and/or beta 1,6' linkages are Oligomate 55 and 50 from Yakult, and Cup Oligo form Nissin Sugar. Alternatively beta1,4'- and beta1,6'-galactosyllactose are commercially available as single components (Carbosynth).

A suitable way to produce beta1,3' GOS, is by using a beta-galactosidase from *S. thermophilus*. Particularly suitable is the use of beta-galactosidase from strain CNCM I-1470 and/or CNCM I-1620 in a process as disclosed in example 4 of FR2723960 or example 6 of EP0778885. *S. thermophilus* CNCM I-1620 was deposited under the Budapest Treaty on 23 August 1995 at Collection Nationale de Cultures de Microorganisms van Institute Pasteur, Paris, France by Compagnie Gervais Danone. Strain *S. thermophilus* CNCM I-1620 is also referred to as strain *S. thermophilus* ST065. *S. thermophilus* CNCM I-1470 was deposited under the Budapest Treaty on 25 Aug. 1994 at Collection Nationale de Cultures de Microorganisms van Institute Pasteur, Paris, France by Compagnie Gervais Danone. The composition of this GOS is also described in more detail in LeForestier et. al., 2009 Eur J Nutr, 48:457-464. Both strains have also been published in WO 96/06924. Another commercially available GOS rich in beta1,3 and beta1,6 galactooligosaccharides is Bimuno from Clasado, or Purimune from GTC Nutrition. Beta1,6'- and beta1,3'-galactosyl-lactose can be enriched or purified from these GOS mixtures as known in the art, for example by size exclusion chromatography. Alternatively, pure beta1,3'-galactosyl-lactose is commercially available (Carbosynth).

The GOS, including BGOS, are non-digestible. Human digestive enzymes (including human lactase) are not able to hydrolyse GOS. GOS when consumed therefore reaches the large intestine intact and is available for fermentation by the intestinal microbiota.

Preferably the nutritional composition according to the present invention comprises at least 250 mg GOS per 100 ml, more preferably at least 400 even more preferably at least 600 mg per 100 ml. Preferably the composition does not comprise more than 2500 mg of GOS per 100 ml, preferably not more than 1500 mg, more preferably not more than 1000 mg. More preferably, the nutritional composition according to the present invention comprises GOS in an amount of 250 to 2500 mg/100 ml, even more preferably in an amount of 400 to 1500 mg/100 ml, even more preferably in an amount of 600 to 1000 mg/100 ml.

Preferably the nutritional composition according to the present invention comprises at least 1.75 wt. % of GOS based on dry weight of the total composition, more preferably at least 2.8 wt. %, even more preferably at least 4.2 wt. %, all based on dry weight of the total composition. Preferably the composition does not comprise more than 17.5 wt. % of GOS based on dry weight of the total composition, more preferably not more than 10.5 wt. %, even more preferably not more than 7 wt %. The nutritional composition according to the present invention preferably comprises GOS in an amount of 1.75 to 17.5 wt. %, more preferably in an amount of 2.8 to 10.5 wt. %, most preferably in an amount of 4.2 to 7 wt. %, all based on dry weight of the total composition.

Preferably the nutritional composition according to the present invention comprises at least 0.35 g GOS per 100 kcal, more preferably at least 0.6 g, even more preferably at least 0.8 g per 100 kcal. Preferably the composition does not comprise more than 3.7 g of GOS per 100 kcal, preferably not more than 2.5 g per 100 kcal, more preferably not more than 1.5 g per 100 kcal. More preferably, the nutritional composition according to the present invention comprises GOS in an amount of 0.35 to 3.7 g per 100 kcal, even more preferably in an amount of 0.6 to 2.5 g per 100 ml, even more preferably in an amount of 0.8 to 1.5 g per 100 ml.

Lower amounts result in a less effective composition, whereas the presence of higher amounts of GOS may result in side-effects such as osmotic disturbances, abdominal pain, bloating, gas formation and/or flatulence.

It is advantageous to have general GOS present in the present nutritional composition, besides the specific beta1,3'-galactosyllactose (beta3'-GL). A mixture of GOS with different sizes and linkages will have an increased beneficial effect on the microbiota and an improved production of short chain fatty acids, which in its turn have a further improved beneficial effect on the intestinal barrier function. The presence of GOS other than beta3'-GL will in particular have an additional effect on the gut barrier function in the large intestine and end of the small intestine, whereas the beta3'-GL will be also, and most, effective in the small intestine.

The total amount of GOS as defined for the present nutritional composition is including the amount of beta1,3'-galactosyllactose.

In a preferred embodiment, the nutritional composition according to the present invention comprises 0.25 to 2.5 g galacto-oligosaccharides per 100 ml, wherein 10 mg to 500 mg per 100 ml of the galacto-oligosaccharides is Gal (beta 1-3)-Gal (beta 1-4)-Glc. In another preferred embodiment, the nutritional composition according to the present invention comprises 0.25 to 2.5 g galacto-oligosaccharides per 100 ml, wherein the amount of Gal (beta 1-3)-Gal (beta 1-4)-Glc is more than 20 wt % based on total galacto-oligosaccharides. In another preferred embodiment, the nutritional composition according to the present invention comprises 0.25 to 2.5 g g galacto-oligosaccharides per 100 ml, wherein the amount of Gal (beta 1-3)-Gal (beta 1-4)-Glc is between 10-500 mg per 100 ml.

In another preferred embodiment, the nutritional composition according to the present invention comprises 0.25 to 2.5 g galacto-oligosaccharides per 100 ml, wherein the amount of Gal (beta 1-3)-Gal (beta 1-4)-Glc is more than 20 wt % based on total galacto-oligosaccharides and wherein the amount of Gal (beta 1-3)-Gal (beta 1-4)-Glc is between 150 mg and 250 mg per 100 ml.

In another preferred embodiment, the nutritional composition according to the present invention comprises 0.25 to 2.5 g galacto-oligosaccharides per 100 ml, wherein the amount Gal (beta 1-3)-Gal (beta 1-4)-Glc is is between 10 mg and 50 mg per 100 ml.

A preferred source of beta1,3'-galactosyl-lactose is the GOS preparation obtained with a beta-galactosidase from *S. thermophilus*, as described in more detail above and in Example 3. Particularly suitable is a GOS preparation obtained by the use of beta-galactosidase from strain CNCM I-1470 and/or CNCM I-1620 (also also referred to as strain *S. thermophilus* ST065). As already described above, this GOS preparation is described in more detail in WO 96/06924, FR2723960 and EP0778885, and in LeForestier et. al., 2009 Eur J Nutr, 48:457-464. The amount of beta1,3'-galactosyl-lactose in this GOS preparation is in the range of 60-65 wt %, based on total galacto0oligosaccharides (excluding lactose, galactose and glucose).

Other preferred sources of beta1,3'-galactosyl-lactose include Bimuno (Clasado) or Purimune (GTC Nutrition).

Preferably the nutritional composition according to the present invention also comprises fructo-oligosaccharides (FOS), as described in more detail below.

Preferably the nutritional composition according to the present invention further comprises a source of protein, a source of lipids and a source of and digestible carbohydrates, as described in more detail below.

Nutritional Composition

Preferably the trisaccharide Gal (beta 1-3)-Gal (beta 1-4)-Glc is present in a nutritional composition. The nutritional composition for use according to the invention, the nutritional composition in the methods and uses of the present invention, and the nutritional composition comprising the trisaccharide for use, i.e. comprising the beta1,3'-galactosyllactose for use, according to the present invention are herein also referred to as the present nutritional composition, or the nutritional composition according to the present invention or the final nutritional composition. The nutritional composition according to the present invention is not human milk.

The present composition is preferably enterally administered, more preferably orally.

The present nutritional composition is preferably an infant formula, a follow on formula or a young child formula. Examples of a young child formula are toddler milk, toddler formula and growing up milk. More preferably the nutritional composition is an infant formula or a follow on formula. The present nutritional composition can be advantageously applied as a complete nutrition for infants. An infant formula is defined as a formula for use in infants and can for example be a starter formula, intended for infants of 0 to 6 or 0 to 4 months of age. A follow on formula is intended for infants of 4 or 6 months to 12 months of age. At this age infants start weaning on other food. A young child formula, or toddler or growing up milk or formula is intended for children of 12 to 36 months of age. Preferably the present nutritional composition is an infant formula.

The present nutritional composition preferably comprises lipid, protein and carbohydrate and is preferably administered in liquid form. The present nutritional composition may also be in the form of a dry food, preferably in the form of a powder which is accompanied with instructions as to mix said dry food, preferably powder, with a suitable liquid, preferably water. The present nutritional composition may thus be in the form of a powder, suitable to reconstitute with water to provide a ready to drink nutritional composition, preferably a ready to drink infant formula, follow on formula or young child formula, more preferably a ready to drink infant formula or follow on formula. The nutritional composition according to the invention preferably comprises other fractions, such as vitamins, minerals, trace elements and other micronutrients in order to make it a complete nutritional composition. Preferably infant formulae comprise vitamins, minerals, trace elements and other micronutrients according to international directives.

The present nutritional composition preferably comprises lipid, protein and digestible carbohydrate wherein the lipid provides 25 to 65% of the total calories, the protein provides 6.5 to 16% of the total calories, and the digestible carbohydrate provides 20 to 80% of the total calories. Preferably, in the present nutritional composition the lipid provides 30 to 55% of the total calories, the protein provides 7 to 9% of the total calories, and the digestible carbohydrate provides 35 to 60% of the total calories. For calculation of the % of total calories for the protein, the total of energy provided by proteins, peptides and amino acids needs to be taken into account.

Preferably the lipid provides 3 to 7 g lipid per 100 kcal, preferably 3.5 to 6 g per 100 kcal, the protein provides 1.6 to 4 g per 100 kcal, preferably 1.7 to 2.3 g per 100 kcal and the digestible carbohydrate provides 5 to 20 g per 100 kcal, preferably 8 to 15 g per 100 kcal of the nutritional composition. Preferably the present nutritional composition comprises lipid providing 3.5 to 6 g per 100 kcal, protein providing 1.7 to 2.3 g per 100 kcal and digestible carbohydrate providing 8 to 15 g per 100 kcal of the nutritional composition.

Preferably the lipid provides 2.5 to 6.5 g lipid per 100 ml, preferably 2.5 to 4 g per 100 ml, the protein provides 1 to 3 g per 100 ml, preferably 1 to 1.5 g per 100 ml and the digestible carbohydrate provides 3 to 13 g per 100 ml, preferably 5 to 10 g per 100 ml of the nutritional composition. Preferably the present nutritional composition comprises lipid providing 2.0 to 6.5 g per 100 ml, protein providing 1 to 3 g per 100 ml and digestible carbohydrate providing 5 to 10 g per 100 ml of the nutritional composition.

Preferably the lipid provides 15 to 45 wt %, preferably 20 to 30 wt. %, based on dry weight of the composition, the protein provides 8 to 20 wt %, preferably 8.5 to 11.5 wt. %, based on dry weight of the composition and the digestible carbohydrates comprise 25 to 90 wt %, preferably 40 to 75 wt. %, based on dry weight of the composition. Preferably the present nutritional composition comprises lipid providing 20 to 30 wt. %, protein providing 8.5 to 11.5 wt. % and digestible carbohydrate providing 40 to 75 wt. %, all based on dry weight of the composition.

The present composition preferably comprises lipids. Preferably the present composition comprises at least one lipid selected from the group consisting of vegetable lipids. Preferably the present composition comprises a combination of vegetable lipids and at least one oil selected from the group consisting of fish oil, algae oil, fungal oil, and bacterial oil. The lipid of the present nutritional composition preferably provides 3 to 7 g per 100 kcal of the nutritional composition, preferably the lipid provides 3.5 to 6 g per 100 kcal. When in liquid form, e.g. as a ready-to-feed liquid, the nutritional composition preferably comprises 2.0 to 6.5 g lipid per 100 ml, more preferably 2.5 to 4.0 g per 100 ml. Based on dry weight the present nutritional composition preferably comprises 15 to 45 wt % lipid, more preferably 20 to 30 wt %. Preferably the lipid comprises the essential fatty acids alpha-linolenic acid (ALA), linoleic acid (LA) and/or long chain polyunsaturated fatty acids (LC-PUFA).

The LC-PUFA, LA and/or ALA may be provided as free fatty acids, in triglyceride form, in diglyceride form, in monoglyceride form, in phospholipid form, or as a mixture of one of more of the above. Preferably the present nutritional composition comprises at least one, preferably at least two lipid sources selected from the group consisting of rape seed oil (such as colza oil, low erucic acid rape seed oil and canola oil), high oleic sunflower oil, high oleic safflower oil, olive oil, marine oils, microbial oils, coconut oil, palm kernel oil.

The present composition preferably comprises long chain poly-unsaturated fatty acids (LC-PUFA). LC-PUFA are fatty acids or fatty acyl chains with a length of 20 to 24 carbon atoms, preferably 20 or 22 carbon atoms, comprising two or more unsaturated bonds. Preferably the composition comprises at least one, preferably two, more preferably three LC-PUFA selected from docosahexaenoic acid (DHA), eicosapentaenoic acid (EPA) and arachidonic acid (ARA). These LC-PUFA were found to improve the gut barrier function and may therefore be particularly advantageously combined with beta1,3'-galactosyllactose in order to further improve the gut barrier. This combination has unexpected advantageous effects and preferably works synergistically. Preferably the composition comprises an elevated amount of such LC-PUFA. Current infant formula, in the case they comprise these LC-PUFA, typically have an amount of the sum of DHA, ARA and EPA of 0.4 to 0.9 wt % based on total fatty acids. In the nutritional composition according to the present invention, preferably the amount of these LC-PUFA is above 1 wt %, preferably above 1.1 wt %, based on total fatty acids. Preferably the amount of these LC-PUFA is not more than 15 wt %, preferably not more than 5 wt %, based on total fatty acids. It is further preferred that the amount of these LC-PUFA is in the range of 1-15 wt %, preferably 1.1-5 wt %, based on total fatty acids. This is considered most optimal range to be used in infant formula for improvement of gut barrier function.

Preferably the amount of DHA is at least 0.4, preferably at least 0.5 wt % based on total fatty acids. Preferably the amount of DHA is not more than 1 wt % based on total fatty acids. Preferably the nutritional composition comprises an amount of EPA of at least 0.09 wt %, preferably at least 0.1 wt %, based on total fatty acids, and preferably not more than 0.4 wt %. Preferably the nutritional composition comprises an amount of ARA of at least 0.25 wt % based on total fatty acids, more preferably at least 0.5 wt % and preferably not more than 1 wt %. Preferably the nutritional composition comprises DHA in amount of 0.4 to 1.0 wt % based on total fatty acids, and EPA in an amount of 0.09 to 0.4 wt % based on total fatty acids. More preferably, the nutritional composition comprises DHA in amount of 0.5 to 0.7 wt % based on total fatty acids, and EPA in an amount of 0.1 to 0.2 wt % based on total fatty acids. It is particularly preferred that the nutritional composition comprises DHA in amount of more than 0.5 wt % based on total fatty acids, and EPA in an amount of more than 0.1 wt % based on total fatty acids. Preferably the nutritional composition comprises DHA, EPA, and ARA in amount of 0.4 to 1.0 wt %, of 0.09 to 0.4 wt %, and of 0.25 to 1.0 wt % based on total fatty acids, respectively. More preferably the nutritional composition comprises DHA, EPA, and ARA in amount of 0.5 to 0.7 wt %, of 0.1 to 0.2 wt %, and of 0.5 to 0.7 wt % based on total fatty acids, respectively.

Preferably the nutritional composition comprises DHA in amount of 20 to 50 mg/100 kcal and EPA in an amount of 4.3 to 10.8 mg/100 kcal. More preferably the nutritional composition comprises DHA in an amount of 25 to 33.5 mg/100 kcal and EPA in an amount of 5.4 to 7.2 mg/100 kcal. Most preferably the nutritional composition comprises DHA in amount of about 25 mg/100 kcal and EPA in an amount of about 5.4 mg/100 kcal. In these embodiments the presence of ARA is optional. If present, the amount of ARA is preferably 12.5 to 50 mg, more preferably 25 to 33.5 mg and most preferably about 25 mg per 100 kcal.

Preferably the weight ratio of DHA/ARA is from 0.9 to 2.

Preferably the weight ratio of DHA/EPA/ARA is 1:(0.19-0.7):(0.9-2.0). Such amounts and/or ratios of DHA, EPA and ARA are optimal for further improving the gut barrier function. The LC-PUFA may be provided as free fatty acids, in triglyceride form, in diglyceride form, in monoglyceride form, in phospholipid form, or as a mixture of one of more of the above. Suitable sources of these LC-PUFA are e.g. fish oil and oil from *Mortierella alpina*.

In an embodiment, the nutritional composition according to the present invention thus comprises lipid, wherein the lipid comprise LC-PUFA selected from the group consisting of DHA, EPA and ARA, and wherein the sum of DHA, ARA and EPA is at least 1 wt % based on total fatty acids. In another embodiment, the lipid comprises at least 0.1 wt % EPA acid based on total fatty acids and at least 0.5 wt % DHA based on total fatty acids, and optionally further at least 0.25 wt % ARA based on total fatty acids. More preferably the lipid comprises at least 0.1 wt % EPA, at least 0.5 wt % DHA and at least 0.25 wt % ARA, all based on total fatty acids. Even more preferably the lipid comprises LC-PUFA selected from the group consisting of DHA, EPA and ARA, wherein the sum of DHA, ARA and EPA is at least 1 wt % based on total fatty acids, and wherein the lipid comprises at least 0.1 wt % EPA, at least 0.5 wt % DHA and at least 0.5 wt % ARA, all based on total fatty acids.

Preferably the nutritional composition according to the present invention comprises lipid, wherein the lipid comprise LC-PUFA selected from the group consisting of DHA, EPA and ARA, and wherein the sum of DHA, ARA and EPA is at least 1 wt % based on total fatty acids, and wherein the lipid comprises DHA in amount of 0.4 to 1.0 wt % based on total fatty acids, EPA in an amount of 0.09 to 0.4 wt % based on total fatty acids and ARA in an amount of 0.25 to 1 wt % based on total fatty acids. In this embodiment it is further preferred that the lipid comprises DHA in an amount of 0.5 to 0.7 wt % based on total fatty acids, EPA in an amount of 0.1 to 0.2 wt % based on total fatty acids and ARA in an amount of 0.5 to 0.7 wt % based on total fatty acids. More preferably the lipid comprises DHA in an amount of at least 0.5 wt %, EPA in an amount of at least 0.1 wt % wt % and ARA in an amount of at least 0.5 wt %, all based on total fatty acids.

The present nutritional composition preferably comprises protein. The protein used in the nutritional composition is preferably selected from the group consisting of non-human animal proteins, preferably milk proteins, vegetable proteins, such as preferably soy protein and/or rice protein, and mixtures thereof. The present nutritional composition preferably contains casein, and/or whey protein, more preferably bovine whey proteins and/or bovine casein. Thus in one embodiment the protein in the present nutritional composition comprises protein selected from the group consisting of whey protein and casein, preferably whey protein and casein, preferably the whey protein and/or casein is from cow's milk. Preferably the protein comprises less than 5 wt % based on total protein of free amino acids, dipeptides, tripeptides or hydrolysed protein. The present nutritional composition preferably comprises casein and whey proteins in a weight ratio casein:whey protein of 10:90 to 90:10, more preferably 20:80 to 80:20, even more preferably 35:65 to 55:45.

The wt % protein based on dry weight of the present nutritional composition is calculated according to the Kjeldahl-method by measuring total nitrogen and using a conversion factor of 6.38 in case of casein, or a conversion factor of 6.25 for other proteins than casein. The term 'protein' or 'protein component' as used in the present invention refers to the sum of proteins, peptides and free amino acids.

The present nutritional composition preferably comprises protein providing 1.6 to 4.0 g protein per 100 kcal of the nutritional composition, preferably providing 11.7 to 2.3 g per 100 kcal of the nutritional composition. A too low protein content based on total calories will result in less adequate growth and development in infants and young children. A too high amount will put a metabolic burden, e.g. on the kidneys of infants and young children. When in liquid form, as a ready-to-feed liquid, the nutritional composition preferably comprises 1.0 to 3.0 g, more preferably 1.0 to 1.5 g protein per 100 ml. Based on dry weight the present nutritional composition preferably comprises 8 to 20 wt % protein, more preferably 8.5 to 11.5 wt %, based on dry weight of the total nutritional composition.

The present nutritional composition preferably comprises digestible carbohydrate providing 5 to 20 g per 100 kcal, preferably 8 to 15 g per 100 kcal. Preferably the amount of digestible carbohydrate in the present nutritional composition is 25 to 90 wt %, more preferably 8.5 to 11.5 wt %, based on total dry weight of the composition. Preferred digestible carbohydrates are lactose, glucose, sucrose, fructose, galactose, maltose, starch and maltodextrin. Lactose is the main digestible carbohydrate present in human milk. The present nutritional composition preferably comprises lactose. Preferably the present nutritional composition does not comprise high amounts of carbohydrates other than lactose. Compared to digestible carbohydrates such as maltodextrin, sucrose, glucose, maltose and other digestible carbohydrates with a high glycemic index, lactose has a lower glycemic index and is therefore preferred. The present nutritional composition preferably comprises digestible carbohydrate, wherein at least 35 wt %, more preferably at least 50 wt %, more preferably at least 60 wt %, more preferably at least 75 wt %, even more preferably at least 90 wt %, most preferably at least 95 wt % of the digestible carbohydrate is lactose. Based on dry weight the present nutritional composition preferably comprises at least 25 wt % lactose, preferably at least 40 wt %, more preferably at least 50 wt % lactose.

In one embodiment, the nutritional composition according to the invention comprises digestible carbohydrates, protein and lipids, wherein the lipids comprise LCPUFA selected from the group consisting of DHA, EPA and ARA, and wherein the sum of DHA, ARA and EPA is at least 1 wt % based on total fatty acids.

The present nutritional composition preferably comprises non-digestible oligosaccharides (NDO). The term "oligosaccharides" as used herein refers to saccharides with a degree of polymerization (DP) of 2 to 250, preferably a DP 2 to 100, more preferably 2 to 60, even more preferably 2 to 10. If oligosaccharide with a DP of 2 to 100 is included in the present nutritional composition, this results in compositions that may contain oligosaccharides with a DP of 2 to 5, a DP of 50 to 70 and/or a DP of 7 to 60. The term "non-digestible oligosaccharides" (NDO) as used in the present invention refers to oligosaccharides which are not digested in the intestine by the action of acids or digestive enzymes present in the human upper digestive tract, e.g. small intestine and stomach, but which are preferably fermented by the human intestinal microbiota. For example, sucrose, lactose, maltose and maltodextrins are considered digestible.

Preferably the present non-digestible oligosaccharides are soluble. The term "soluble" as used herein, when having reference to a polysaccharides, fibres or oligosaccharides, means that the substance is at least soluble according to the method described by L. Prosky et al., J. Assoc. Off. Anal. Chem. 71, 1017-1023 (1988).

Beta1,3'-galactosyllactose is considered a non-digestible oligosaccharide, more in particular a non-digestible galacto-oligosaccharide. As described above, the beta1,3'-galactosyllactose may be present in the nutritional composition according to the invention as such, or as part of a mixture of galacto-oligosaccharides (GOS), preferably beta-galacto-oligosaccharides (BGOS). In a preferred embodiment the beta1,3'-galactosyllactose is present as part of a mixture of galacto-oligosaccharides.

Galacto-oligosaccharides, and preferred embodiments of the present nutritional composition comprising galacto-oligosaccharides, are described in more detail above.

In one embodiment, the nutritional composition according to the invention comprises 1.6 to 4 g protein, 5 to 20 g digestible carbohydrates and 0.35 to 3.7 g galacto-oligosaccharides per 100 kcal of the composition, wherein the amount of Gal (beta 1-3)-Gal (beta 1-4)-Glc is more than 20 wt % based on total galacto-oligosaccharides. In another embodiment, the nutritional composition according to the invention comprises 1.6 to 4 g protein, 5 to 20 g digestible carbohydrates and 0.35 to 3.7 g galacto-oligosaccharides per 100 kcal of the composition, wherein the amount of Gal (beta 1-3)-Gal (beta 1-4)-Glc is between 150 mg and 250 mg per 100 ml. In yet another embodiment, the nutritional composition according to the invention comprises 1.6 to 4 g protein, 5 to 20 g digestible carbohydrates and 0.35 to 3.7 g galacto-oligosaccharides per 100 kcal of the composition, wherein the amount of Gal (beta 1-3)-Gal (beta 1-4)-Glc is more than 20 wt % based on total galacto-oligosaccharides, and wherein the amount of Gal (beta 1-3)-Gal (beta 1-4)-Glc is between 150 mg and 250 mg per 100 ml.

In another embodiment, the nutritional composition according to the invention comprises 1.6 to 4 g protein, 5 to 20 g digestible carbohydrates and 0.35 to 3.7 g galacto-oligosaccharides per 100 kcal of the composition, wherein the amount of Gal (beta 1-3)-Gal (beta 1-4)-Glc is between 10 mg and 50 mg per 100 ml.

Preferably the present nutritional composition also comprises fructo-oligosaccharides (FOS). The term "fructo-oligosaccharides" as used in the present invention refers to carbohydrates composed of over 50%, preferably over 65% fructose units based on monomeric subunits, in which at least 50%, more preferably at least 75%, even more preferably at least 90%, of the fructose units are linked together via a beta-glycosidic linkage, preferably a beta-2,1 glycosidic linkage. A glucose unit may be present at the reducing end of the chain of fructose units. Preferably the fructo-oligosaccharides have a DP or average DP in the range of 2 to 250, more preferably 2 to 100, even more preferably 10 to 60. The term "fructo-oligosaccharides" comprises levan, hydrolysed levan, inulin, hydrolysed inulin, and synthesised fructo-oligosaccharides. Preferably the preparation comprises short chain fructo-oligosaccharides with an average degree of polymerization (DP) of 3 to 6, more preferably hydrolysed inulin or synthetic fructo-oligosaccharide. Preferably the preparation comprises long chain fructo-oligosaccharides with an average DP above 20. Preferably the preparation comprises both short chain and long chain fructo-oligosaccharides. Fructo-oligosaccharide suitable for use in the composition of the invention is also readily commercially available, e.g. RaftilineHP (Orafti). Preferably the nutritional composition according to the present invention comprises at least 25 mg FOS per 100 ml, more preferably at least 40 even more preferably at least 60 mg. Preferably the composition does not comprise more than 250 mg FOS per 100 ml, more preferably not more than 150 mg per 100 ml and most preferably not more than 100 mg per 100 ml. The amount of FOS is preferably 25 to 250 g fructo-oligosaccharides per 100 ml, preferably 40 to 150 g per 100 ml, more preferably 60 to 100 g per 100 ml. Preferably the nutritional composition according to the present invention comprises at least 0.15 wt. % FOS based on dry weight, more preferably at least 0.25 wt. %, even more preferably at least 0.4 wt. %. Preferably the composition does not comprise more than 1.5 wt. % FOS based on dry weight of the total composition, more preferably not more than 2 wt. %. The presence of FOS shows a further improved effect on the microbiota and its SCFA production.

Preferably the present nutritional composition comprises a mixture of galacto-oligosaccharides (including the beta1, 3'-galactosyllactose) and fructo-oligosaccharides. Preferably the mixture of galacto-oligosaccharides and fructo-oligosaccharides is present in a weight ratio of from 1/99 to 99/1, more preferably from 1/19 to 19/1, more preferably from 1/1 to 19/1, more preferably from 2/1 to 15/1, more preferably from 5/1 to 12/1, even more preferably from 8/1 to 10/1, even more preferably in a ratio of about 9/1. This weight ratio is particularly advantageous when the galacto-oligosaccharides have a low average DP and fructo-oligosaccharides has a relatively high DP. Most preferred is a mixture of galacto-oligosaccharides with an average DP below 10, preferably below 6, and fructo-oligosaccharides with an average DP above 7, preferably above 11, even more preferably above 20.

In a preferred embodiment the present nutritional composition comprises a mixture of short chain (sc) fructo-oligosaccharides and long chain (lc) fructo-oligosaccharides. Preferably the mixture of short chain fructo-oligosaccharides and long chain fructo-oligosaccharides is present in a weight ratio of from 1/99 to 99/1, more preferably from 1/19 to 19/1, even more preferably from 1/10 to 19/1, more preferably from 1/5 to 15/1, more preferably from 1/1 to 10/1. Preferred is a mixture of short chain fructo-oligosaccharides with an average DP below 10, preferably below 6 and a fructo-oligosaccharides with an average DP above 7, preferably above 11, even more preferably above 20.

In another preferred embodiment the present nutritional composition comprises a mixture of short chain (sc) fructo-oligosaccharides and short chain (sc) galacto-oligosaccharides. Preferably the mixture of short chain fructo-oligosaccharides and short chain galacto-oligosaccharides is present in a weight ratio of from 1/99 to 99/1, more preferably from 1/19 to 19/1, even more preferably from 1/10 to 19/1, more preferably from 1/5 to 15/1, more preferably from 1/1 to 10/1. Preferred is a mixture of short chain fructo-oligosaccharides and short chain galacto-oligosaccharides with an average DP below 10, preferably below 6.

The present nutritional composition preferably comprises 1.75 to 17.5 wt % total non-digestible oligosaccharides, more preferably 2.8 to 10.5 wt %, most preferably 4.2 to 7 wt %, based on dry weight of the nutritional composition. Based on 100 ml the present nutritional composition preferably comprises 0.25 to 2.5 g total non-digestible oligosaccharides, more preferably 0.4 to 1.5 g, most preferably 0.6 to 1 g, based on 100 ml of the nutritional composition. A lower amount of non-digestible oligosaccharides will be less effective in improving the gut barrier function, whereas a too high amount will result in side-effects of bloating and abdominal discomfort. The total amount of non-digestible oligosaccharides includes galacto-oligosaccharides, including beta3'-GL, fructo-oligosaccharides and any additional non-digestible oligosaccharides that may further be present in the composition.

The present nutritional composition comprises the trisaccharide Gal (beta 1-3)-Gal (beta 1-4)-Glc, also referred to as beta1,'3-galactosyllactose or beta3'-GL. Preferably the composition comprises at least 10 mg per 100 ml beta3'-GL. Preferably the nutritional composition comprises at most 500 mg beta3'-GL per 100 ml. Preferably the nutritional composition comprises beta3'-GL in an amount of 10-500 mg per 100 ml. Preferably the nutritional composition comprises beta3'-GL in an amount of 15 to 750 mg per 100 kcal. Preferably the nutritional composition comprises beta3'-GL in an amount of 0.07 to 3.75 wt % based on dry weight of the composition.

Low doses of beta3'-GL can be used as it was found that beta3'-GL was already effective at a low dose in improving the gut barrier function. Preferably the nutritional composition comprises beta3'-GL in an amount of 10 to 75 mg per 100 ml, most preferably in an amount of 10 to 50 mg/100 ml. Preferably the nutritional composition comprises beta3'-GL in an amount of 15 to 75 mg per 100 kcal. Preferably the nutritional composition comprises beta3'-GL in an amount of 0.07 to 0.375 wt %, based on dry weight of the composition.

In another embodiment the amount of beta3'-GL is relatively high. In this embodiment the composition comprises at least 150 mg beta3'-GL per 100 ml. Preferably the nutritional composition comprises at most 500 mg, preferably at most 250 mg beta3'-GL per 100 ml. More preferably the nutritional composition comprises 150 to 500 mg beta3'-GL per 100 ml, most preferably the nutritional composition comprises 150 to 250 mg beta3'-GL per 100 ml. Preferably the nutritional composition comprises beta3'-GL in an amount of 225 to 375 mg per 100 kcal. Preferably the nutritional composition comprises beta3'-GL in an amount of 1.125 to 1.725 wt %, based on dry weight of the composition.

Preferably the composition comprises at least 1 wt % of beta3'-GL based on total GOS. Preferably the nutritional composition comprises at most 70 wt % beta3'-GL based on total GOS. More preferably the nutritional composition comprises 1.3 to 10 wt % beta3'-GL based on total GOS, most preferably 1.3 to 7 wt % beta3'-GL based on total GOS. Preferably the composition comprises at least 0.8 wt % of beta3'-GL based on total NDO. Preferably the nutritional composition comprises at most 65 wt % beta3'-GL based on total NDO. More preferably the nutritional composition comprises 1.1 to 9 wt % beta3'-GL based on total NDO, most preferably 1.1 to 6.5 wt % based on total NDO.

It is also important that the nutritional composition according to the present invention does not have an excessive caloric density, however still provides sufficient calories to feed the subject. Hence, the liquid food preferably has a caloric density between 0.1 and 2.5 kcal/ml, more preferably a caloric density of between 0.5 and 1.5 kcal/ml, even more preferably between 0.6 and 0.8 kcal/ml, and most preferably between 0.65 and 0.7 kcal/ml.

In a preferred embodiment of the nutritional composition according to the present invention, the nutritional composition is an infant formula, a follow on formula or a young child formula. The invention thus also relates to an infant formula, follow on formula or young child formula, preferably an infant formula or follow on formula, comprising:
  a. 1.6 to 4 g protein based on 100 kcal,
  b. 5 to 20 g digestible carbohydrates based on 100 kcal,
  c. 3 to 7 g lipid based on 100 kcal, wherein the lipid comprises:
    i. an LC-PUFA selected from the group consisting of DHA, EPA and ARA, wherein the sum of DHA, ARA and EPA is at least 1 wt % based on total fatty acids, and/or
    ii. at least 0.1 wt % EPA based on total fatty acids and at least 0.5 wt % DHA based on total fatty acids, and optionally further at least 0.25 wt % ARA based on total fatty acids,
  d. 0.25 to 2.5 g non-digestible oligosaccharides per 100 ml of ready to drink formula, wherein the non-digestible oligosaccharides comprise Gal (beta 1-3)-Gal (beta 1-4)-Glc in an amount of 10 to 500 mg per 100 ml ready to drink formula.

The infant formula, follow on formula or young child formula may be in the form of a liquid, preferably a ready to drink liquid, or in the form of a powder. In one embodiment the infant formula, follow on formula or young child formula is in the form of a powder, suitable to reconstitute with water to provide a ready to drink infant formula, follow on formula or young child formula. It is to be understood that when the infant formula, follow on formula or young child formula according to the invention is in the form of a powder, the amount of non-digestible oligosaccharides and beta3'-galactosyl-lactose in said formula are defined as the amounts that would be present after reconstitution of the powder with water, i.e. the amounts are defined in mg per 100 ml ready to drink formula.

In this embodiment it is preferred that the sum of DHA, ARA and EPA is at least 1 wt % based on total fatty acids and that the lipid comprises at least 0.1 wt % EPA and at least 0.5 wt % DHA based on total fatty acids. The lipid optionally further comprises at least 0.25 wt % ARA, based on total fatty acids. More preferably the sum of DHA, ARA and EPA is at least 1 wt % based on total fatty acids, and the lipid comprises at least 0.1 wt % EPA, at least 0.5 wt % DHA based and at least 0.25 wt % ARA, based on total fatty acids.

Preferably the infant formula, follow on formula or young child formula according to the invention comprises 0.25 to 2.5 g galacto-oligosaccharides per 100 ml, preferably 0.4 to 1.5 g per 100 ml, more preferably 0.6 to 1.0 g per 100 ml. Preferably, the infant formula, follow on formula or young child formula according to the invention comprises 0.025 to 0.25 g fructo-oligosaccharides per 100 ml, preferably 0.04 to 0.15 g per 100 ml, more preferably 0.06 to 0.1 g per 100 ml. More preferably, the infant formula, follow on formula or young child formula according to the invention comprises 0.4 to 1.5 g galacto-oligosaccharides and 0.04 to 0.15 g fructo-oligosaccharides per 100 ml. Even more preferably, the infant formula, follow on formula or young child formula according to the invention comprises 0.6 to 1.0 g des galacto-oligosaccharides and 0.06 to 0.1 g fructo-oligosaccharides per 100 ml.

The infant formula, follow on formula or young child formula according to the invention is for use in providing nutrition to an infant or young child, preferably an infant.

The invention further relates to an infant formula, follow on formula or young child formula, preferably an infant formula or follow on formula, comprising:
a. 1.6 to 4 g protein based on 100 kcal,
b. 5 to 20 g digestible carbohydrates based on 100 kcal,
c. 3 to 7 g lipid based on 100 kcal, wherein the lipid comprises:
   i. an LC-PUFA selected from the group consisting of DHA, EPA and ARA, wherein the sum of DHA, ARA and EPA is at least 1 wt % based on total fatty acids, and/or
   ii. at least 0.1 wt % EPA based on total fatty acids and at least 0.5 wt % DHA based on total fatty acids, and optionally further at least 0.25 wt % ARA based on total fatty acids,
d. 0.25 to 2.5 g non-digestible oligosaccharides per 100 ml of ready to drink formula, wherein the non-digestible oligosaccharides comprise Gal (beta 1-3)-Gal (beta 1-4)-Glc in an amount of 10 to 500 mg per 100 ml ready to drink formula, for use in increasing the intestinal barrier function and/or for use in the prevention and/or treatment of intestinal barrier disruption in a subject; or for use in the treatment, prevention and/or alleviation of a toxin exposure associated condition in a subject, wherein the toxin preferably is a mycotoxin, more preferably a tricothecene toxin, most preferably deoxynivalenol.

The preferred embodiments described above for the infant formula, follow on formula and young child formula according to the invention also apply to the present infant formula for use, follow on formula for use and young child formula for use.

Application

It was found that specifically beta1,3'-galactosyl-lactose has an unexpected advantageous effect on increasing intestinal barrier function. Hence beta1,3'-galactosyl-lactose can be used for the prevention and/or treatment of intestinal barrier disruption and further that beta1,3'-galactosyl-lactose is effective for the treatment, prevention and/or alleviation of a toxin exposure associated condition.

The present invention thus relates to the trisaccharide Gal (beta 1-3)-Gal (beta 1-4)-Glc for use in increasing the intestinal barrier function and/or for use in the prevention and/or treatment of intestinal barrier disruption in a subject. In other words the invention relates to a method for increasing the intestinal barrier function and/or for prevention and/or treatment of intestinal barrier disruption in a subject, the method comprising administering the trisaccharide Gal (beta 1-3)-Gal (beta 1-4)-Glc to the subject.

The invention further relates to a nutritional composition for use in increasing the intestinal barrier function and/or for use in the prevention and/or treatment of intestinal barrier disruption in a subject, wherein the nutritional composition comprises the trisaccharide Gal (beta 1-3)-Gal (beta 1-4)-Glc (beta1,3'-galactosyllactose) as an active ingredient. In other words the invention relates to a method for increasing the intestinal barrier function and/or for prevention and/or treatment of intestinal barrier disruption in a subject, the method comprising administering a nutritional composition comprising the trisaccharide Gal (beta 1-3)-Gal (beta 1-4)-Glc as an active ingredient to the subject.

The invention further relates to a nutritional composition comprising the trisaccharide Gal (beta 1-3)-Gal (beta 1-4)-Glc, for use in the treatment, prevention and/or alleviation of a toxin exposure associated condition in a subject, wherein the toxin preferably is a mycotoxin, more preferably a tricothecene toxin, most preferably the toxin is deoxynivalenol. The toxin exposure associated condition is a toxin mediated intestinal barrier disruption. In other words the invention relates to a method for the treatment, prevention and/or alleviation of a toxin exposure associated condition in a subject, wherein the toxin preferably is a mycotoxin, more preferably a tricothecene toxin, and most preferably the toxin is deoxynivalenol, the method comprising administering a nutritional composition comprising the trisaccharide Gal (beta 1-3)-Gal (beta 1-4)-Glc to the subject. The toxin exposure associated condition is a toxin mediated intestinal barrier disruption.

In case administering a nutritional composition to an infant is considered non-therapeutic, the present invention can be worded as a non-therapeutic method for increasing the intestinal barrier function and/or for prevention and/or treatment of intestinal barrier disruption in a subject, the method comprising administering the trisaccharide Gal (beta 1-3)-Gal (beta 1-4)-Glc to the subject or administering a nutritional composition comprising the trisaccharide Gal (beta 1-3)-Gal (beta 1-4)-Glc as an active ingredient to the subject. In one embodiment the invention relates to a non-therapeutical method for the treatment, prevention and/or alleviation of a toxin exposure associated condition in a subject, wherein the toxin preferably is a mycotoxin, more preferably a tricothecene toxin, and most preferably the toxin is deoxynivalenol, the method comprising administering a nutritional composition comprising the trisaccharide Gal (beta 1-3)-Gal (beta 1-4)-Glc to the subject. The toxin exposure associated condition is a toxin mediated intestinal barrier disruption.

The trisaccharide Gal (beta 1-3)-Gal (beta 1-4)-Glc is herein also referred to as beta1,3'-galactosyllactose or beta3'-GL.

In the context of the present invention the term "prevention" means "reducing the risk of" or "reducing the severity of". The term "prevention of a certain condition" also includes "treatment of a person at risk of said condition".

The methods or uses according to the present invention, comprising administering the present nutritional composition to a subject in need thereof, also refer to administering an effective amount of the nutritional composition to the subject.

In a preferred embodiment, the nutritional composition according to the invention is an infant formula, follow on formula or young child formula, preferably an infant formula. In the context of the present invention, an infant is defined as a human having an age of 0 to 12 months and a young child is defined as a human having an age of 13 to 36 months. The present nutritional composition is thus preferably administered to an infant or young child, more preferably to an infant with an age of 0 to 12 months, most preferably an infant with an age of 0 to 6 months. In a preferred embodiment, the methods or uses according to the present invention are for healthy infants, preferably for healthy, term infants. In newborns, the intestinal tract is not yet fully developed and infants are in need of support for developing the intestinal barrier function and/or resistance to pathogens and/or allergens. In one embodiment infants born via c-section are in need of the support on intestinal barrier resistance and/or function according to the present invention In a preferred embodiment, the subject in the present invention is a subject having an impaired intestinal barrier or is at risk of developing an impaired intestinal barrier. In one embodiment the subject is a preterm or prematurely born infant. Especially this subgroup of infants may benefit from being administered the trisaccharide Gal (beta 1-3)-Gal (beta 1-4)-Glc, since organs making up the intestinal tract of preterms are immature, as opposed to term-born infants and thus in need of increasing the intestinal barrier function, improved intestinal barrier integrity, reduced permeability of the intestinal barrier and/or reduced intestinal barrier disruption.

In infants, intestinal barrier function can easily be determined without the need for invasive techniques, for example by a mannitol-lactulose absorption test, see Jalonen, J Allergy Clin Immunol 1991; 88:737-742.

Intestinal epithelial stress or damage may contribute to allergic sensitization against certain food antigens. Bol-Schoenmakers et al. (Mucosal Immunol. 2016 November; 9(6):1477-1486) demonstrated that deoxynivalenol (DON) facilitates allergic sensitization to food proteins and that development of sensitization can be induced by different molecular mechanisms and local immune responses (IL8). Therefore, it is assumed that food contaminants, including DON, contribute to allergic sensitization in humans.

Mycotoxins are secondary metabolites produced by moulds and fungi contaminating cereal grains as well as forages, fruits, feed and food products as well as the environment (e.g., soil, water and air through aerosol acquired mycotoxicosis, etc.). Mycotoxins may have dangerous effects on human and animal health. Of particular note are the trichothecene mycotoxins, which are a class of compounds produced by the species *Fusarium graminearum*. This large family of sesquiterpene epoxides are closely related and vary by the position and number of hydroxylations and substitutions of a basic chemical structure. The major trichothecene produced by *Fusarium graminearum* is deoxynivalenol (DON) also known as vomitoxin for its ability to induce vomiting. The impact of DON on nutrient absorption in human intestinal epithelial cells has been investigated in Maresca et al. "The mycotoxin deoxynivalenol affects nutrient absorption in human intestinal epithelial cells" J. Nutr. Vol. 132 (2002) 2723-2731, and in Avantaggiato et al. "Evaluation of the intestinal absorption of deoxynivalenol and nivalenol by an in vitro gastrointestinal model, and the binding efficacy of activated carbon and other absorbent materials" Food and Chemical Toxicology vol. 42 (2004) 817-824.

Mycotoxins can appear in the food chain as a result of fungal infection of plant products (e.g., forage, grain, plant protein, processed grain by-products, roughage and molasses products), and can either be eaten directly by humans, or introduced by contaminated grains, livestock or other animal feedstuff(s). Since DON frequently occurs in toxicologically relevant concentrations in cereals and grains, it can be qualified as a genuine problem for all humans and animals consuming a diet comprising cereals and/or grains. It is a particular concern for infants, and with that in mind Codex Committees on Contaminants in Food (CCCF) have been dedicated to provide maximum limits for deoxynivalenol levels still deemed acceptable in raw cereal grains such as wheat and barley grain and infant formula.

In an embodiment of the present invention, the trisaccharide for use, the nutritional composition for use, or the nutritional composition in the methods and uses according to the invention is administered to subjects at risk, preferably infants or young children that consume cereals or cereal-comprising products, in particular on two days or more per week, for example on three days or four days or five days or six days per week or daily, and/or infants or young children that suffer from or are at increased risk of suffering from food allergy and/or atopic dermatitis. An infant at increased risk of suffering from or developing a food allergy is an infant born from parents of whom one or both suffers from an atopic disease, or an infant who has one or more siblings suffering from an atopic disease. These infants and young children have a higher risk of becoming allergic to certain foods, e.g. to dietary proteins, in particular cow's milk proteins.

LIST OF EMBODIMENTS

1. The trisaccharide Gal (beta 1-3)-Gal (beta 1-4)-Glc (beta1,3'-galactosyllactose) for use in increasing the intestinal barrier function and/or for use in the prevention and/or treatment of intestinal barrier disruption in a subject.

2. The trisaccharide for use according to embodiment 1, wherein the trisaccharide is present in a nutritional composition.

3. A nutritional composition for use in increasing the intestinal barrier function and/or for use in the prevention and/or treatment of intestinal barrier disruption in a subject, wherein the nutritional composition comprises the trisaccharide Gal (beta 1-3)-Gal (beta 1-4)-Glc (beta1,3'-galactosyllactose) as an active ingredient.

4. A nutritional composition comprising the trisaccharide Gal (beta 1-3)-Gal (beta 1-4)-Glc, for use in the treatment, prevention and/or alleviation of a toxin exposure associated condition in a subject, wherein the toxin preferably is a mycotoxin, more preferably a tricothecene toxin, most preferably the toxin is deoxynivalenol (DON).

5. The nutritional composition according to embodiment 4, wherein the toxin exposure associated condition is a toxin mediated intestinal barrier disruption.

6. The trisaccharide for use according to embodiments 1 or 2, or the nutritional composition for use according to any one of embodiments 3-5, wherein said trisaccharide or said nutritional composition is for administration to infants or young children of 0 to 36 month of age, preferably to infants.

7. The trisaccharide for use according to any one of embodiments 1, 2 or 6, or the nutritional composition for use according to any one of embodiments 3-6, wherein said trisaccharide or said nutritional composition is for administration to subjects at risk, preferably infants or young children that consume cereals or cereal-comprising products, preferably two or more times per week, and/or infants or young children that suffer from or are at increased risk of suffering from food allergy and/or atopic dermatitis.

8. The nutritional composition comprising the trisaccharide for use according to embodiment 2, or the nutritional composition for use according to any one of embodiments 3-7, wherein the nutritional composition is an infant formula, follow on formula or young child formula.

9. The nutritional composition comprising the trisaccharide for use according to embodiment 2 or embodiment 8, or the nutritional composition for use according to any one of embodiments 3-8, wherein the nutritional composition comprises 0.07 to 3.75 wt % Gal (beta 1-3)-Gal (beta 1-4)-Glc, based on dry weight of the nutritional composition, and/or wherein the daily dose to be administered is 0.10 to 6 g Gal (beta 1-3)-Gal (beta 1-4)-Glc.

10. The nutritional composition comprising the trisaccharide for use according to embodiment 2, 8 or 9, or the nutritional composition for use according to any one of embodiments 3-9, wherein the nutritional composition comprises 10 to 500 mg Gal (beta 1-3)-Gal (beta 1-4)-Glc per 100 ml of the composition.

11. The nutritional composition comprising the trisaccharide for use according to any one of embodiments 2 or 8-10, or the nutritional composition for use according to any one of embodiments 3-10, wherein the nutritional composition comprises 1.6 to 4 g protein, 5 to 20 g digestible carbohydrates and 0.35 to 3.7 g galacto-oligosaccharides per 100 kcal of the composition, wherein the amount of Gal (beta 1-3)-Gal (beta 1-4)-Glc is more than 20 wt % based on total galacto-oligosaccharides and/or wherein the amount of Gal (beta 1-3)-Gal (beta 1-4)-Glc is between 150 mg and 250 mg per 100 ml.

12. The nutritional composition comprising the trisaccharide for use according to any one of embodiments 2, or 8-10, or the nutritional composition for use according to any one of embodiments 3-10, wherein the nutritional composition comprises 1.6 to 4 g protein, 5 to 20 g digestible carbohydrates and 0.35 to 3.7 g galacto-oligosaccharides per 100 kcal of the composition, wherein the amount of Gal (beta 1-3)-Gal (beta 1-4)-Glc is between 10 mg and 50 mg per 100 ml.

13. The nutritional composition comprising the trisaccharide for use according to any one of embodiments 2 or 8-12, or the nutritional composition for use according to any one of embodiments 3-12, wherein the nutritional composition further comprises digestible carbohydrates, protein and lipids, and wherein the lipids comprise LC-PUFA selected from the group consisting of DHA, EPA and ARA, wherein preferably the sum of DHA, ARA and EPA is at least 1 wt % based on total fatty acids.

BRIEF DESCRIPTION OF THE FIGURES

FIG. 1:

Effects of different galactosyllactoses (GLs) on the DON-induced impairment of the Caco-2 cell monolayer integrity.

Figure 1A:
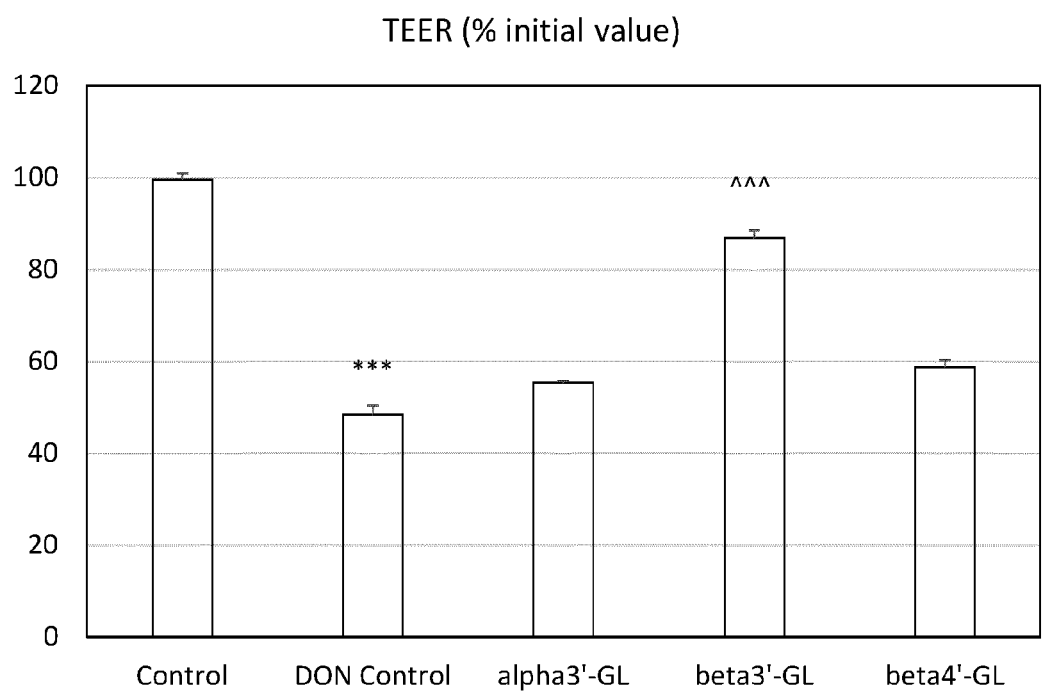
FIGS. 1A and 1B shows the transepithelial electrical resistance (TEER) for different GLs.
Figure 1B:
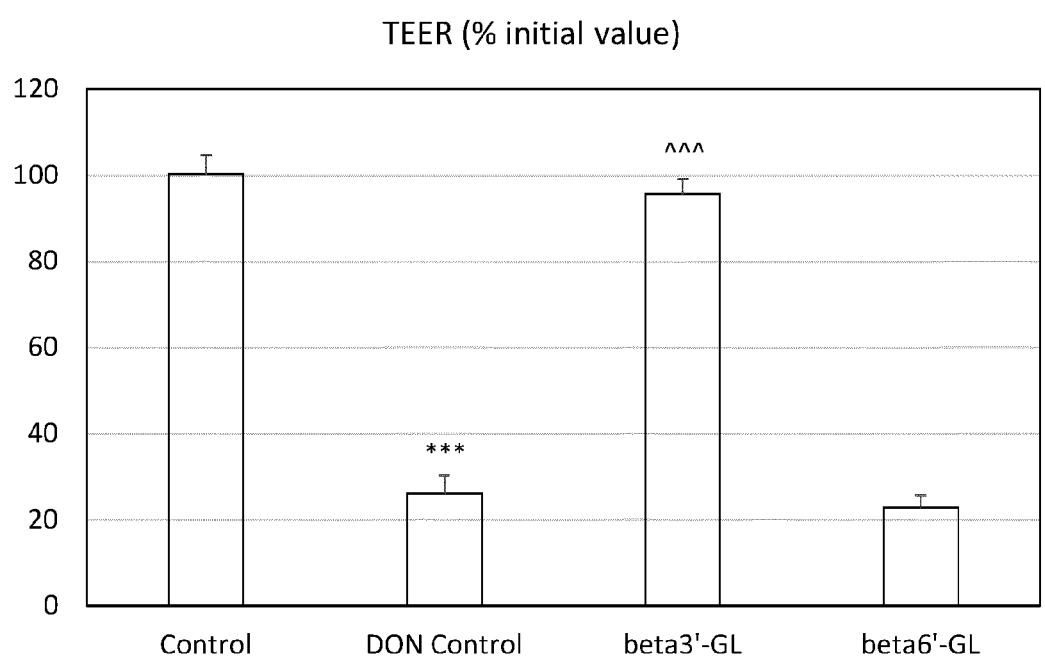
Figure 1C:
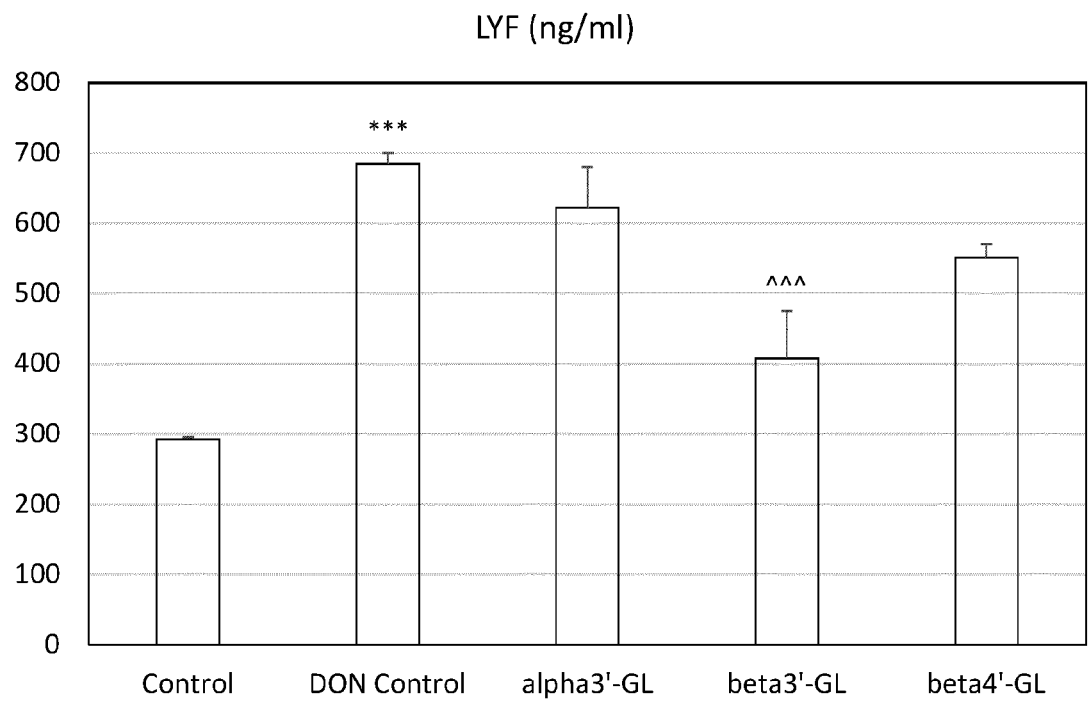
FIGS. 1C and 1D show the translocation of lucifer yellow (LYF) to the basolateral compartment. TEER was expressed as a percentage of the initial value and LYF was expressed in $ng/cm^2 \times h$, i.e. in ng/ml. alpha3'-GL is Gal (alpha 1-3)-Gal (beta 1-4)-Glc; beta3'-GL is Gal (beta 1-3)-Gal (beta 1-4)-Glc; beta4'-GL is Gal (beta 1-4)-Gal (beta 1-4)-Glc'; beta6'-GL is Gal (beta 1-6)-Gal (beta 1-4)-Glc. Data are the mean±s.e. *: $p<0.05$ compared to control, : $p<0.01$ compared to control, *: $p<0.001$ compared to control, ^: $p<0.05$ compared to DON control, ^^ $p<0.01$ compared to DON Control, ^^^ $p<0.001$ compared to DON Control.
Figure 1D:
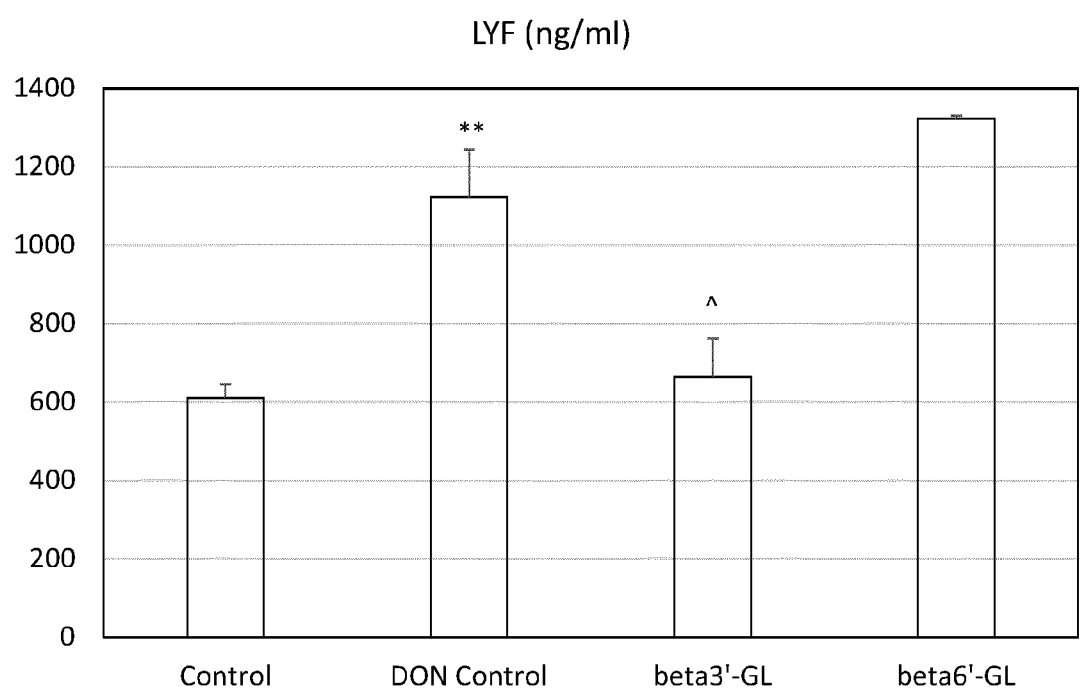

Different effects of GLs on the DON-induced increase in IL8 release by Caco-2 cells. IL-8 secretion is expressed as pg/ml as mean±s.e. alpha3'-GL is Gal (alpha 1-3)-Gal (beta 1-4)-Glc; beta3'-GL is Gal (beta 1-3)-Gal (beta 1-4)-Glc, beta4'-GL is Gal (beta 1-4)-Gal (beta 1-4)-Glc, beta6'-GL is Gal (beta 1-6)-Gal (beta 1-4)-Glc. Data are the mean±s.e. *: $p<0.05$ compared to control, : $p<0.01$ compared to control, *: $p<0.001$ compared to control, ^: $p<0.05$ compared to DON control, ^^ $p<0.01$ compared to DON Control, ^^^ $p<0.001$ compared to DON Control.

EXAMPLES

Example 1: Label Free Targeted LC-ESI-MS$^2$ Analysis of Beta3'-[and Beta6']-Galactosyllactose in Human Milk with Enhanced Structural Selectivity Fresh human milk volunteer samples from different stages of lactation were spiked with internal standards including e.g. α-Arabinopentaose. Then, 3 anonymized spiked milk specimens (2 healthy donors, 3 different stages of lactation), anonymized spiked milk specimens were diluted 1:10 with $H_2O$ and subjected to ultrafiltration (UF) with 3 kDa cut off. UF permeates were analysed by liquid chromatography electrospray ionisation tandem mass spectrometry (LC-ESI-MS$^2$). LC-separation of galactosyllactoses (GLs) and other human milk compounds was facilitated by 2.1×30 mm+2.1× 10 mm porous graphitized carbon HPLC columns connected in line with a linear ion trap mass spectrometer.

Gradient elution of GLs started with 0.3% $NH_4OH$ in $H_2O$ at 0 min and ended with 0.3% $NH_4OH$ in 95% methanol at 27 min. Constant flow rate was at 0.4 ml/min and columns were kept at 45 degrees Celsius. Eluting GLs were characterized by negative ion multiple reaction monitoring (MRM) LC-ESI-MS$^2$.

Employed MRM transitions had been determined before by MS/MS experiments with commercially available pure GL-standards using collision induced dissociation (CID) fragmentation. Further details on the methods can be found in Mank M, Welsch P, Heck A J R, Stahl B, Anal Bioanal Chem 2019, 411 (1):231-250.

beta3'-GL and beta6'-GL were detected directly in human milk samples from various stages of lactation (4, 125 and 159 days post-partum). The results are shown in Table 1. Interestingly, the abundance of beta3'-GL appeared to be relatively stable between colostral and mature milks, whereas the amount of beta6'-GL strongly declined over time.

TABLE 1 beta3'-GL and beta6'-GL in human milk samples from various stages of lactation.

| Postpartum day | beta3'-GL (mg/100 ml) | beta6'-GL |
|---|---|---|
| 4 | 10 | 95 |
| 125 | 3 | 14 |
| 159 | 4 | 10 |

Example 2: Beta1,3'-Galactosyllactose Specifically Protects Against Intestinal Barrier Disruption and Prevents Permeability Increase beta1,3'-galactosyl-lactose (beta3'-GL), beta1,4'-galactosyllactose (beta4'-GL) and beta1,6'-galactosyl-lactose (beta6'-GL) were obtained from Carbosynth (Berkshire, UK). alpha1,3'-galactosyl-lactose (alpha3'-GL) was obtained from Elicityl (Crolles, France). Purified deoxydivalenol (DON) (D0156; Sigma Aldrich, St Luis, MO, USA) was dissolved in pure ethanol and stored at −20° C. Human epithelial colorectal adenocarcinoma (Caco-2) cells were obtained from American Type Tissue Collection (Code HTB-37) (Manasse, VA, USA, passage 90-102).

Caco-2 cells were used according to established methods. In brief: cells were cultured in Dulbecco's modified Eagle medium (DMEM) and seeded at a density of $0.3 \times 10^5$ cells into 0.3 cm$^2$ high pore density (0.4 μm) inserts with a polyethylene terephthalate membrane (BD Biosciences, Franklin Lakes, NJ, USA) placed in a 24-well plate. The Caco-2 cells were maintained in a humidified atmosphere of 95 air and 5% $CO_2$ at 37° C. After 17-19 days of culturing, a confluent monolayer was obtained with a mean Transepithelial electrical resistance (TEER) exceeding 400 Ωcm$^2$ measured by a Millicell-Electrical Resistance System voltohm-meter (Millipore, Temecula, CA, USA).

Caco-2 cell monolayers were thus grown in a transwell system, which is a model for intestinal barrier function. The monolayers were pretreated for 24 h with different GLs, including beta3'-GL, alpha3'-GL, beta4'-GL and beta6'-GL in a concentration of 0.75 wt % of the GL, before being exposed to the fungal toxin deoxynivalenol (DON), which is a trigger and model compound to impair intestinal barrier. DON was diluted to a final concentration of 4.2 M in complete cell medium and added to the apical side as well as to the basolateral side of the transwell inserts. This DON concentration did not affect the viability of the Caco-2 cells. Incubation with DON was 24 h.

Measurements of the transepithelial electrical resistance (TEER) and lucifer yellow (LY) permeability were conducted to investigate barrier integrity. For TEER measurements a Millicel-ERS voltohmmeter connected to a pair of chopsticks electrodes was used to measure the TEER values. Results are expressed as a percentage of the initial value. For paracellular tracer flux assay the membrane impermeable lucifer yellow (LY) (Sigma, St Luis, MO, USA) was added in a concentration of 16 μg/ml to the apical compartment in the transwell plate for 4 h, and the paracellular flux was determined by measuring the fluorescence intensity in the basolateral compartment with a spectrophotofluorimeter (FLUOstar Optima, BMG Labtech, Offenburg, Germany) set at excitation and emission wavelengths of 410 and 520 nm, respectively. Release of interleukin-8 (IL-8 or CXCL8), which is a typical marker for inflammation, was quantified in the medium of the apical side and the basolateral side of the Caco-2 transwell inserts in response to the treatments. CXCL8 concentrations were measured by using the human IL-8 ELISA assay (BD Biosciences, Pharmingem, San Diego, CA, USA) according to manufacturer's instructions. For more details on materials and methods see Akbari et al, 2016, Eur J Nutr. 56(5):1919-1930.

Figure 2:
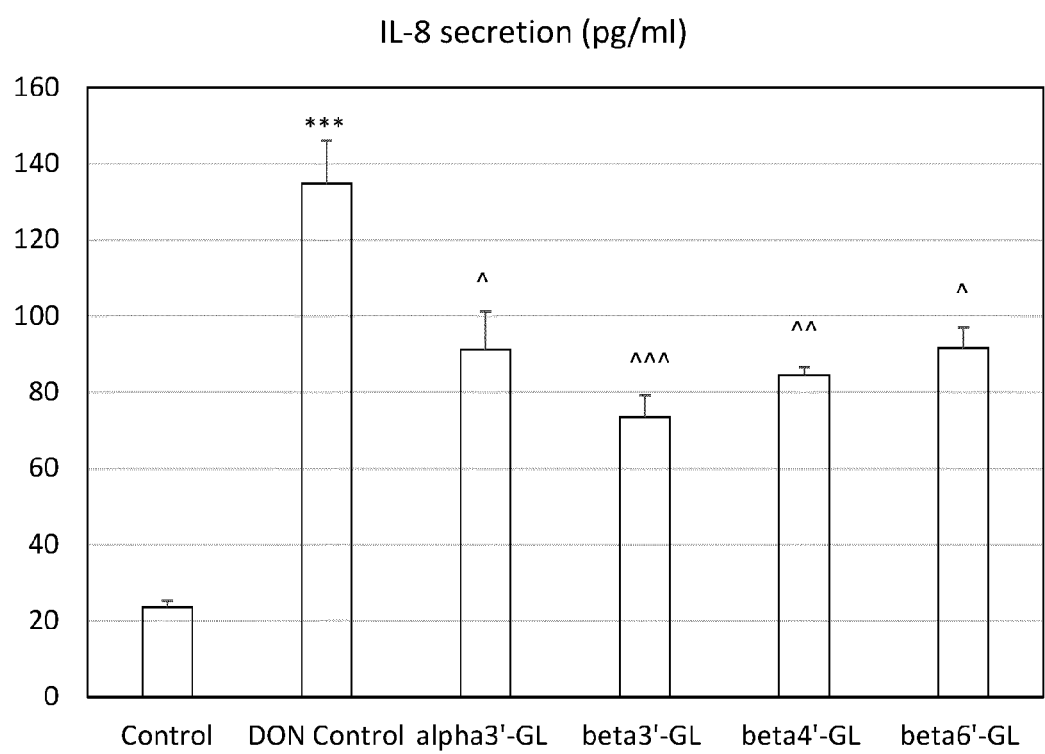
FIG. 2.

The results are shown in FIGS. 1 A, B, C and D and in FIG. 2. FIG. 1 shows the effects of different galactosyllactoses (GLs) on the DON-induced impairment of the Caco-2 cell monolayer integrity. FIGS. 1A and 1B show the transepithelial electrical resistance (TEER) for different GLs. FIGS. 1C and 1D show the translocation of lucifer yellow (LYF) to the basolateral compartment. TEER was expressed as a percentage of the initial value and LYF was expressed in ng/cm$^2$×h. alpha3'-GL is Gal (alpha 1-3)-Gal (beta 1-4)-Glc; beta3'-GL is Gal (beta 1-3)-Gal (beta 1-4)-Glc; beta4'-GL is Gal (beta 1-4)-Gal (beta 1-4)-Glc; beta6'-GL is Gal (beta 1-6)-Gal (beta 1-4)-Glc. Data are the mean±s.e. *: $p<0.05$ compared to control, : $p<0.01$ compared to control, *: $p<0.001$ compared to control, ^: $p<0.05$ compared to DON control, ^^ $p<0.01$ compared to DON Control, ^^^ $p<0.001$ compared to DON Control.

As can be seen from FIGS. 1A-D, the presence of DON disrupted the barrier function as shown by a decreased TEER value and an increased LY flux for the DON-control samples. Additionally, the presence of DON increased CXCL8 (IL-8) release, as shown in FIG. 2. FIGS. 1A-D further show that the presence of beta3'-GL prevented the DON-induced loss of epithelial barrier integrity as measured by increased TEER values and a reduction in the DON-affected LY flux across the intestinal epithelial monolayer. beta4'-GL and beta6'-GL did not show a significant effect on the intestinal epithelial barrier function. Interestingly, beta3'-GL, i.e. the galactosyl-lactose with a β1-3 glycosidic linkage, was effective in protecting the intestinal barrier function, whereas alpha3'-GL, i.e. the galactosyl-lactose with an α1-3 glycosidic linkage, did not prevent the DON-induced disrupted intestinal barrier. In contrast, all galactosyl-lactoses were able to decrease the DON-induced IL-8 release, as is shown in FIG. 2.

These results are indicative for the specific effect of beta3'-GL (herein also referred to as beta1,3'-galactosyllactose or Gal (beta 1-3)-Gal (beta 1-4)-Glc) on protecting the intestinal epithelial barrier function, in particular under conditions of challenges, which goes beyond and/or is independent of an effect on preventing an inflammatory response, and/or of an effect on or via the microbiota. These results are thus indicative of an effect that beta3'-GL has on increasing the intestinal barrier function and/or on the prevention and/or treatment of intestinal barrier disruption. In addition, these results are indicative of an effect of beta3'-GL on the treatment, prevention and/or alleviation of a toxin exposure associated condition in a subject, in particular when the toxin is a tricothecene toxin, and more in particular when the toxin is deoxynivalenol.

Example 3: Also in Mixtures of Galacto-Oligosaccharides Beta3'-GL Specifically Protects Against Intestinal Barrier Disruption and Prevents Permeability Increase Several GOS preparations, comprising varying amounts of beta3'-GL, were tested in this experiment. As a source of beta4'-GL and beta6'-GL VivinalGOS (VGOS) was used. VivinalGOS is available from FrieslandCampina Domo (Amersfoort, The Netherlands) and contains about 59% GOS on dry matter. The DP3 of this GOS is predominantly 4'GL and 6'G.

Another GOS preparation, herein referred to as TOS, was produced in house by incubating a lactose mixture with *Streptococcus thermophilus* strain ST065 (this strain is also referred to as strain *S. thermophilus* CNCM I-1620), as described in more detail in WO 96/06924, FR2723960 and EP0778885, and in LeForestier et. al., 2009 Eur J Nutr, 48:457-464, with the additional step that *S. thermophilus* cell debris material was removed by centrifugation. The obtained TOS was used as a source of beta4'-GL, beta6'-GL and beta3'-GL. The amount of galacto-oligosaccharides (excluding lactose, galactose and glucose) was 10.2 wt % per 100 ml, of which about 60-65 wt % (62 wt %) was beta3'-GL, the remainder being 6'-GL and non-digestible oligosaccharides with DP 2, 4 and 5 (see also WO 96/06924, FR2723960 and EP0778885 and LeForestier et. al., 2009 Eur J Nutr, 48:457-464).

Barrier function experiments were performed in a similar way as in example 2 using the following concentrations of Vivinal GOS (VGOS): 0 (Control), 0.25 wt % (VGOS 0.25), 0.5 wt % (VGOS 0.5), 0.75 wt % (VGOS 0.75), 1 wt % (VGOS 1), 1.5 wt % (VGOS 1.5) and 2 wt % (VGOS 2). For TOS concentrations of 0.25 wt % (TOS 0.25) and 0.5 wt % (TOS 0.5) were tested. The results are shown in Tables 2 and 3.

The effects of different GOS mixtures on the DON-induced impairment of the Caco-2 cell monolayer integrity were measured. Different GLs were tested for transepithelial electrical resistance (TEER), as shown in Table 2, and for the translocation of lucifer yellow (LYF) to the basolateral compartment, as shown in Table 3. TEER was expressed as a percentage of the initial value and LYF was expressed in ng/cm$^2$×h. GOS is VivinalGOS. TOS is the galacto-oligosaccharide mixture produced by *S. thermophilus* ST065 beta galactosidase and containing about 65 wt % beta3'-GL based on total galacto-oligosaccharides. Data in Tables 2 and 3 are the mean±s.e.

*: $p<0.05$ compared to control,
**: $p<0.01$ compared to control;
***: $p<0.001$ compared to control;

^: $p<0.05$ compared to DON control;
^^ $p<0.01$ compared to DON Control;
^^^ $p<0.001$ compared to DON Control.

for an additional 48 h in the presence of IL-4 (25 ng/ml). IL-4 was added to the basolateral compartment; medium and additives were changed every 24 h.

TABLE 2

Transepithelial electrical resistance (TEER) for different GOS mixtures, wherein TEER is expressed as a percentage of the initial value.

| TEER | Control | DON | VGOS 0.25 | VGOS 0.5 | VGOS 0.75 | VGOS 1 | VGOS 1.5 | VGOS 2 | TOS 0.25 | TOS 0.5 |
|---|---|---|---|---|---|---|---|---|---|---|
| Mean | 99.95 | 29.93 *** | 33.04 *** | 34.75 *** | 34.83 *** | 36.36 *** | 47.5 *** | 90.66 ^^ | 88.9 ^^^^ | 85.84 ^^ |
| Std. Error | 2.488 | 0.0353 | 1.632 | 0.4837 | 2.387 | 3.595 | 0.3964 | 2.144 | 7.025 | 4.165 |

TABLE 3

Translocation of lucifer yellow (LYF) to the basolateral compartment for different GOS mixtures, wherein LYF is expressed in $ng/cm^2 \times h$.

| LYF | Control | DON | VGOS 0.25 | VGOS 0.5 | VGOS 0.75 | VGOS 1 | VGOS 1.5 | VGOS 2 | TOS 0.25 | TOS 0.5 |
|---|---|---|---|---|---|---|---|---|---|---|
| Mean | 377.8 | 622.8 *** | 618.9 ^ *** | 571.9 *** | 574.8 *** | 451.1 ** ^^ | 396.3 ^^^ | 384.9 ^^^ | 406.8 ^^^ | 436 ^^^ |
| Std. Error | 1.208 | 25.31 | 13.05 | 9.299 | 6.053 | 1.598 | 10.31 | 4.166 | 4.456 | 1.975 |

VGOS only improved the barrier function as determined by preventing TEER decrease at relatively high concentration of 2 wt %. Also the LY flux was only prevented by relatively high concentrations of VGOS of 1 wt % or above. TOS, on the other hand, was already effective at a concentration of 0.25 wt %. Since the main difference between VGOS and TOS is the presence of GOS with a beta1.3' link between the galactose moieties in TOS, and more in particular the presence of a high amount of beta3'-GL in TOS, this is indicative again for an effect of beta3'-GL on the gut barrier function, and this effect is maintained in the presence of other GOS structures. Also this effect is observed with beta3'-GL concentrations lower than about 0.17 wt %.

Example 4: LC-PUFA with Short Chain Fatty Acid Fermentation Products Improve Gut Barrier Function The effect of a long chain polyunsaturated fatty acids (LC-PUFA) and a mixture of short chain fatty acids (SCFA mix) having a concentration profile that is typical for fermentation of a mixture of galacto-oligosaccharides (TOS) derived from VivinalGOS and long chain fructo-oligosaccharides (RaftilineHP) in a ratio of 9/1 (w/w) on barrier permeability was investigated, as disclosed in Example 3 of EP2100520 (incorporated by reference herein) The SCFA mix had a fatty acid profile as shown in FIG. 3A of EP2100520 (incorporated by reference herein) (see second bar in FIG. 3A), i.e. about 75% being acetic acid.

Methods

T84 human intestinal epithelial cells are commonly used to study intestinal barrier integrity in vitro. T84 cells (ATCC, USA) were cultured on 12 mm transwell inserts (0.4 μm, Corning Costrar, USA) in DMEM-F12 glutamax with penicillin-streptomycin (100 IU/ml), supplemented with 5% FBS-HI. T84 cells were used 14 days after reaching confluence. Monolayers of T84 cultured on transwell filters were pre-incubated with LC-PUFA, SCFA mix or a combination thereof. The EPA-containing samples were incubated Epithelial barrier integrity was assessed by measuring transepithelial resistance (TEER; $\Omega \times cm^2$) with the epithelial volt-ohm meter (EVOM; World Precision Instruments, Germany). TEER measurements were performed prior to medium refreshment at 0, 24, 48, 72, 96 h of incubation.

Results are shown in Table 4.

TABLE 4

Effect of LC-PUFA on the gut barrier function.

| LC-PUFA | Conc LC-PUFA (μM) | SCFA mix (mM) (C2-C4 fatty acids) | % TEER (48 h) Mean (s. d.) |
|---|---|---|---|
| — | — | 4 | 6 (10) |
| ARA/EPA/DHA | 100 | — | 40 (7) |
| ARA/EPA/DHA | 100 | 4 | 71 (6) |

This example shows an improved effect of LC-PUFA on the gut barrier function, and in particular in combination with the fermentation products. Therefore this example is indicative of a further improved effect on the intestinal barrier function in a composition, when combining beta3'-GL, enhanced levels of LC-PUFA (EPA, DHA and ARA) and GOS fermentation products. Beta3'-GL and the LC-PUFA will have a direct effect on the intestinal barrier function, whereas additional non-digestible oligosaccharides, in particular GOS other than beta3'GL, will beneficially affect the intestinal barrier function via the SCFA formation.

Example 5: Infant Formula

An infant formula, provided as a powder in a pack with instructions to reconstitute with water to a ready to drink milk. When reconstituted the formula contains per 100 ml:
  68 kcal
  about 1.4 g Protein (mainly whey protein and casein from bovine)
  about 3.2 g Lipid, wherein the amount of DHA is 0.52 wt %, EPA is 0.11 wt % and ARA is 0.52 wt % based on total fatty acids about 8.1 g digestible carbohydrates (mainly lactose)

about 815 to 830 mg non-digestible oligosaccharides, comprising of 735 to 750 mg galacto-oligosaccharides, of which 15 to 30 mg beta3'-GL (sources Vivinal GOS and GOS produced by the betagalactosidase from *S. thermophilus* CNCM-I-1620) and about 80 mg IcFOS (source RaftilinHP) minerals, trace elements, vitamins and other micronutrients as known in the art and according to international directives for infant formula.

Example 6: Follow on Formula

A follow on formula, provided as a powder in a pack with instructions to reconstitute with water to a ready to drink milk. When reconstituted the formula contains per 100 ml:

68 kcal about 1.4 g Protein (mainly whey protein and casein from bovine)

about 3.2 g Lipid, wherein the amount of DHA is 0.52 wt %, EPA is 0.11 wt % and ARA is 0.52 wt % based on total fatty acids about 8.1 g digestible carbohydrates (mainly lactose)

about 720 mg galacto-oligosaccharides, of which about 140 mg beta3'-GL, (500 mg from Vivinal GOS and 220 mg from GOS produced by the betagalactosidase from *S. thermophilus* CNCM-I-1620, respectively) and about 80 mg IcFOS (source RaftilinHP)

minerals, trace elements, vitamins and other micronutrients as known in the art and according to international directives for infant formula.

The invention claimed is:

1. A method for increasing the intestinal barrier function and/or for prevention and/or treatment of intestinal barrier disruption in infants or young children that suffer from food allergy and/or atopic dermatitis, the method comprising administering an infant formula, follow on formula of young child formula to the infants or young children, wherein the infant formula, follow on formula or young child formula comprises:
   a. 1.6 to 4 g protein based on 100 kcal,
   b. 5 to 20 g digestible carbohydrates based on 100 kcal,
   c. 3 to 7 g lipid based on 100 kcal, wherein the lipid comprises:
      i. LC-PUFA selected from the group consisting of DHA, EPA and ARA, wherein the sum of DHA, ARA and EPA is at least 1 wt % based on total fatty acids, and
      ii. at least 0.1 wt % EPA based on total fatty acids and at least 0.5 wt % DHA based on total fatty acids, and at least 0.25 wt % ARA based on total fatty acids,
   d. 0.25 to 2.5 g galacto-oligosaccharides per 100 ml of ready to drink formula, wherein the galacto-oligosaccharides comprise Gal (beta 1-3)-Gal (beta 1-4)-Glc in an amount of 10 to 50 mg per 100 ml ready to drink formula;
   e. 0.025 to 0.25 g fructo-oligosaccharides per 100 ml.

2. A method for the treatment, prevention and/or alleviation of a toxin exposure associated condition in infants or young children that suffer from food allergy and/or atopic dermatitis, the method comprising administering an infant formula, follow on formula or young child formula to the infants or young children that suffer from food allergy and/or atopic dermatitis, wherein the toxin exposure associated condition is a toxin mediated intestinal barrier disruption, wherein the infant formula, follow on formula or young child formula comprises:
   a. 1.6 to 4 g protein based on 100 kcal,
   b. 5 to 20 g digestible carbohydrates based on 100 kcal,
   c. 3 to 7 g lipid based on 100 kcal, wherein the lipid comprises:
      i. LC-PUFA selected from the group consisting of DHA, EPA and ARA, wherein the sum of DHA, ARA and EPA is at least 1 wt % based on total fatty acids, and
      ii. at least 0.1 wt % EPA based on total fatty acids and at least 0.5 wt % DHA based on total fatty acids, and at least 0.25 wt % ARA based on total fatty acids,
   0.25 to 2.5 g galacto-oligosaccharides per 100 ml of ready to drink formula, wherein the galacto-oligosaccharides comprise Gal (beta 1-3)-Gal (beta 1-4)-Glc in an amount of 10 to 50 mg per 100 ml ready to drink formula;
   e. 0.025 to 0.25 g fructo-oligosaccharides per 100 ml.

3. The method according to claim 1, wherein the infant formula, follow on formula or young child formula is administered to infants or young children of 0 to 36 month of age.

4. The method according to claim 1, wherein the infant formula, follow on formula or young child formula comprises 0.07 to 3.75 wt % Gal (beta 1-3)-Gal (beta 1-4)-Glc, based on dry weight of the nutritional composition, and/or wherein the daily dose administered is 0.10 to 6 g Gal (beta 1-3)-Gal (beta 1-4)-Glc.

5. The method according to claim 1, wherein the infant formula, follow on formula or young child formula comprises 0.35 to 3.7 g galacto-oligosaccharides per 100 kcal of the formula.

6. Infant formula, follow on formula or young child formula, comprising:
   f. 1.6 to 4 g protein based on 100 kcal,
   g. 5 to 20 g digestible carbohydrates based on 100 kcal,
   h. 3 to 7 g lipid based on 100 kcal, wherein the lipid comprises:
      i. LC-PUFA selected from the group consisting of DHA, EPA and ARA, wherein the sum of DHA, ARA and EPA is at least 1 wt % based on total fatty acids, and
      ii. at least 0.1 wt % EPA based on total fatty acids and at least 0.5 wt % DHA based on total fatty acids, and at least 0.25 wt % ARA based on total fatty acids,
   i. 0.25 to 2.5 g galacto-oligosaccharides per 100 ml of ready to drink formula, wherein the galacto-oligosaccharides comprise Gal (beta 1-3)-Gal (beta 1-4)-Glc in an amount of 10 to 50 mg per 100 ml ready to drink formula
   j. 0.025 to 0.25 g fructo-oligosaccharides per 100 ml.

7. The infant formula, follow on formula or young child formula according to claim 6, wherein the infant formula, follow on formula or young child formula is in the form of a powder, suitable to reconstitute with water to provide a ready to drink infant formula, follow on formula or young child formula.

8. The method according to claim 2, wherein the infant formula, follow on formula or young child formula is administered to infants or young children of 0 to 36 month of age.

9. The method according to claim 2, wherein the infant formula, follow on formula or young child formula comprises 0.07 to 3.75 wt % Gal (beta 1-3)-Gal (beta 1-4)-Glc, based on dry weight of the nutritional composition, and/or wherein the daily dose administered is 0.10 to 6 g Gal (beta 1-3)-Gal (beta 1-4)-Glc.

10. The method according to claim 2, wherein the infant formula, follow on formula or young child formula comprises 0.35 to 3.7 g galacto-oligosaccharides per 100 kcal of the formula.

\* \* \* \* \*